US009305286B2

(12) United States Patent
Larsen et al.

(10) Patent No.: US 9,305,286 B2
(45) Date of Patent: *Apr. 5, 2016

(54) MODEL-DRIVEN CANDIDATE SORTING

(71) Applicant: HireVue, Inc., South Jordan, UT (US)

(72) Inventors: Loren Larsen, Lindon, UT (US);
Benjamin Taylor, Lehi, UT (US)

(73) Assignee: HireVue, Inc., South Jordan, UT (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/668,864

(22) Filed: Mar. 25, 2015

(65) Prior Publication Data

US 2015/0206103 A1 Jul. 23, 2015

Related U.S. Application Data

(63) Continuation of application No. 14/183,346, filed on Feb. 18, 2014, now Pat. No. 9,009,045.

(60) Provisional application No. 61/913,781, filed on Dec. 9, 2013.

(51) Int. Cl.
*G10L 15/06* (2013.01)
*G06Q 10/10* (2012.01)
(Continued)

(52) U.S. Cl.
CPC ........ *G06Q 10/1053* (2013.01); *G06F 17/3053* (2013.01); *G06N 5/04* (2013.01); *G06N 99/005* (2013.01); *G10L 25/48* (2013.01); *G10L 25/54* (2013.01); *G10L 2015/088* (2013.01)

(58) Field of Classification Search
CPC .... G10H 1/0091; H04N 5/60; G06F 17/3082; G06F 21/32; G06F 3/167; G06F 17/26; G06F 17/3053; G06F 19/363; G06F 17/60; G06F 17/30793; G06F 17/30817; G06F 8/71; G06F 17/279; G06F 21/31; G06F 9/4443; G10L 21/00; G10L 15/22; G10L 13/08; G10L 17/26; G10L 19/018; G10L 21/0264; G10L 15/06; G10L 15/24; G10L 25/48; G10L 2015/088; G10L 25/54; G10L 13/033; G10L 13/10; G10L 15/26; G06Q 10/1053; G06N 5/04; G06N 99/005; G09B 7/02; G09B 7/04; G09B 7/00; G09B 19/18; G09B 5/06; G09B 5/065; G09B 5/14; G09B 5/00
USPC ........ 704/235, 251, 255, 257, 272, 270, 277, 704/243, 250
See application file for complete search history.

(56) References Cited

U.S. PATENT DOCUMENTS 7,725,405 B2 5/2010 Johnson
8,266,068 B1 9/2012 Foss et al.
(Continued)

FOREIGN PATENT DOCUMENTS

EP 1598760 A1 11/2005
WO 2007/142533 A1 12/2007
WO 2009/029802 A2 3/2009

OTHER PUBLICATIONS

International Search Report & Written Opinion mailed on Apr. 2, 2015, from application No. PCT/US2014/068308.

(Continued)

*Primary Examiner* — Huyen Vo
(74) *Attorney, Agent, or Firm* — Lowenstein Sandler LLP

(57) ABSTRACT

Methods and systems for model-driven candidate sorting for evaluating digital evaluations are described. In one embodiment, a sorting tool selects a data set of digital evaluation data for sorting. The data set includes candidate for evaluation candidates. The sorting tool analyzes the candidate data for the respective evaluation candidate to identify digital evaluation cues and applies the digital evaluation cues to a prediction model to predict an achievement index for the respective evaluation candidate. The list of evaluation candidates is sorted according the predicted achievement indices and the sorted list is presented to the reviewer in a user interface.

20 Claims, 17 Drawing Sheets

(51) Int. Cl.
  *G10L 25/54*  (2013.01)
  *G10L 25/48*  (2013.01)
  *G06F 17/30*  (2006.01)
  *G06N 5/04*   (2006.01)
  *G06N 99/00*  (2010.01)
  *G10L 15/08*  (2006.01)

(56) References Cited

U.S. PATENT DOCUMENTS

| | | | |
|---|---|---|---|
| 2002/0055844 A1* | 5/2002 | L'Esperance et al. | 704/260 |
| 2002/0110248 A1* | 8/2002 | Kovales et al. | 381/56 |
| 2002/0119433 A1 | 8/2002 | Callender | |
| 2002/0143573 A1 | 10/2002 | Bryce et al. | |
| 2004/0186743 A1 | 9/2004 | Cordero, Jr. | |
| 2005/0060175 A1 | 3/2005 | Farber et al. | |
| 2005/0235321 A1 | 10/2005 | Ahmad-Taylor | |
| 2007/0088601 A1 | 4/2007 | Money et al. | |
| 2007/0285505 A1 | 12/2007 | Korneliussen | |
| 2009/0136014 A1* | 5/2009 | Bigue et al. | 379/207.02 |
| 2009/0164942 A1 | 6/2009 | Laaksonen et al. | |
| 2011/0145161 A1* | 6/2011 | Scarborough | G06Q 10/063 705/321 |
| 2011/0213726 A1 | 9/2011 | Schalk et al. | |
| 2012/0271774 A1 | 10/2012 | Clegg | |
| 2013/0111401 A1 | 5/2013 | Newman et al. | |

OTHER PUBLICATIONS

Joachims, T. (Jun. 1999). Transductive inference for text classification using support vector machines. In ICML (vol. 99, pp. 200-209).

McCallum, A., & Nigam, K. (Jul. 1998). A comparison of event models for naive bayes text classification. In AAAI-98 workshop on learning for text categorization (vol. 752, pp. 41-48).

McAfee, L. (2008). Document Classification using Deep Belief Nets. CS224n, Sprint.

USPTO Notice of Allowance for U.S. Appl. No. 14/183,393 mailed Apr. 14, 2014.

USPTO Notice of Allowance for U.S. Appl. No. 14/301,191 mailed Aug. 18, 2014.

USPTO Notice of Allowance for U.S. Appl. No. 14/183,346 mailed Dec. 8, 2014.

USPTO Non-Final Office Action for U.S. Appl. No. 14/183,346 mailed Aug. 21, 2014.

* cited by examiner

MODEL-DRIVEN CANDIDATE SORTING

RELATED APPLICATIONS

This application is a continuation of U.S. application Ser. No. 14/183,346, filed Feb. 18, 2014 which claims the benefit of U.S. Provisional Application No. 61/913,781, filed Dec. 9, 2013, the entire contents of which are incorporated herein by reference. This application is related to U.S. patent application Ser. No. 14/183,393, filed Feb. 18, 2014, the entire contents of which are incorporated herein by reference.

BACKGROUND

Finding and hiring employees is a task that impacts most modern businesses. It is important for an employer to find employees that "fit" open positions. Criteria for fitting an open position may include skills necessary to perform job functions. Employers may also want to evaluate potential employees for mental and emotional stability, ability to work well with others, ability to assume leadership roles, ambition, attention to detail, problem solving, etc.

However, the processes associated with finding employees can be expensive and time consuming for an employer. Such processes can include evaluating resumes and cover letters, telephone interviews with candidates, in-person interviews with candidates, drug testing, skill testing, sending rejection letters, offer negotiation, training new employees, etc. A single employee candidate can be very costly in terms of man-hours needed to evaluate and interact with the candidate before the candidate is hired.

Computers and computing systems can be used to automate some of these activities. For example, many businesses now have on-line recruiting tools that facilitate job postings, resume submissions, preliminary evaluations, etc. Additionally, some computing systems include functionality for allowing candidates to participate in "virtual" on-line interviews.

While computing tools have automated interview response gathering, there is still a lot of effort spent in evaluating responses. Often, respondents may be evaluated individually and ranked in the aggregate while side-by-side comparisons of specifics for different candidates may be difficult. For example, an evaluator, to compare specific answers of interviewees side by side, would need to search through stored responses for one candidate, access responses for another candidate, and search through the responses for the other candidate to find corresponding data needed for comparisons.

The job of interviewers and candidate reviewers is to determine if candidates are skilled and have the qualifications required for a particular job. In the process of doing this, they compare and contrast the qualifications of candidates—often reviewing and comparing candidate responses to particular questions or tasks. As noted, the comparison process is often difficult as interviews are reviewed linearly (from beginning to end) and comparing responses for each candidate to a specific question is tedious and requires reordering and cross comparing. The result is that responses are often not evaluated equally, fairly or in light of other candidate responses.

Evaluation of candidates can be a very subjective process that is highly dependent on individual interviewers. However, large organizations may wish to remove or minimize subjectivity to maximize recruiting efforts, avoid charges of discrimination, or for other reasons. Various schemes exist to this end, but each of these schemes approaches the solution in different ways. Thus, an employer that makes a commitment to a provider of an automated interview and/or evaluation system is often constrained to that provider's solution.

The subject matter claimed herein is not limited to embodiments that solve any disadvantages or that operate only in environments such as those described above. Rather, this background is only provided to illustrate one exemplary technology area where some embodiments described herein may be practiced.

BRIEF DESCRIPTION OF THE DRAWINGS

The present invention is illustrated by way of example, and not by way of limitation, in the figures of the accompanying drawings in which like references indicate similar elements. It should be noted that different references to "an" or "one" embodiment in this disclosure are not necessarily to the same embodiment, and such references mean at least one.

FIG. 5 is an exemplary user interface for viewing digital interviews before model-driven candidate sorting according to one embodiment.

FIG. 6 is a graphical user interface an exemplary user interface for viewing digital interviews after model-driven candidate sorting according to one embodiment.

DETAILED DESCRIPTION

Figure 1:
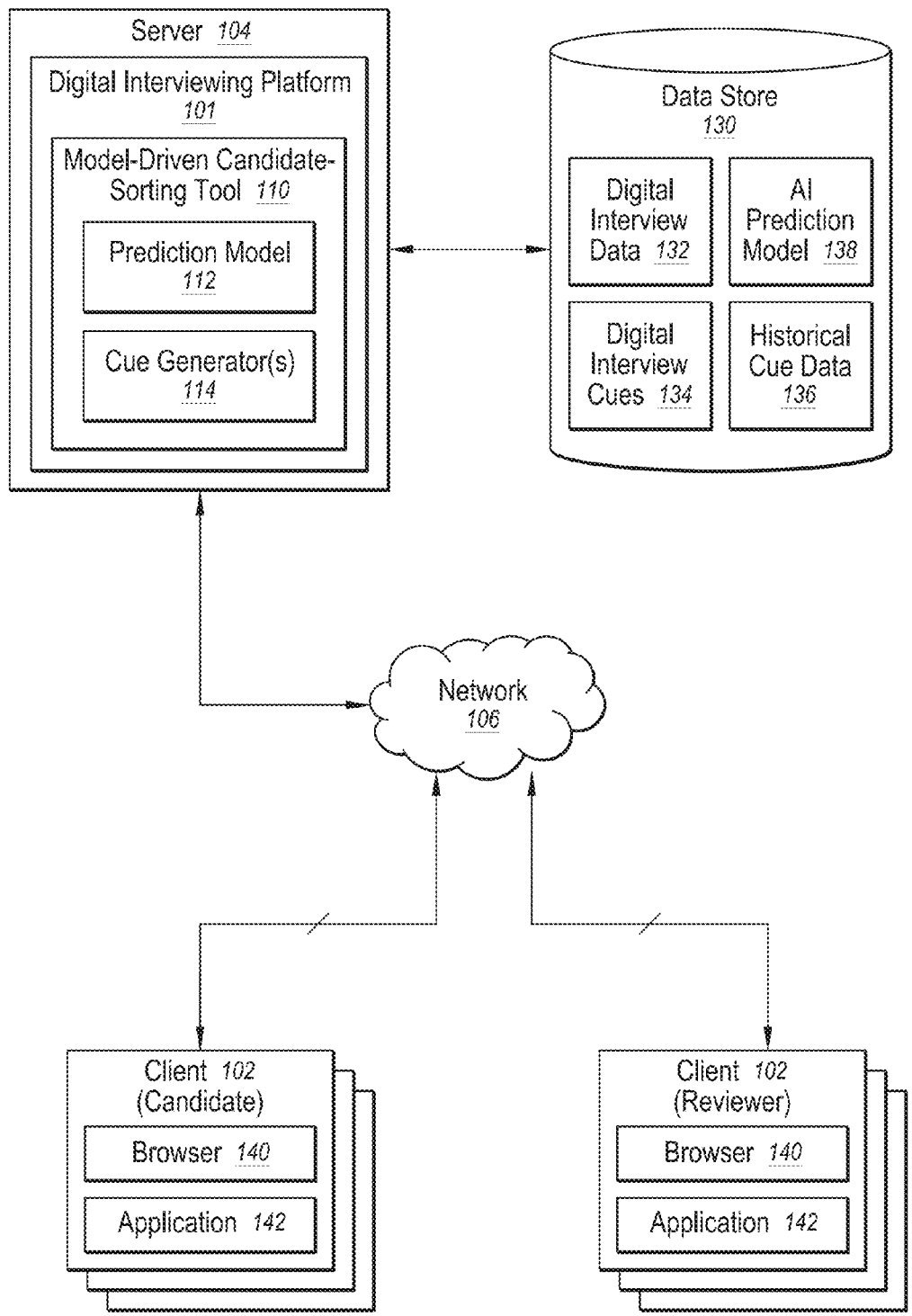
FIG. 1 is a block diagram of an exemplary network architecture in which embodiments of a model-driven candidate-sorting tool may operate.

Methods and systems for model-driven candidate sorting for reviewing digital interviews are described. In the following description, numerous details are set forth. In one embodiment, a model-driven candidate-sorting tool selects a data set of digital interview data for sorting. The data set includes candidate for interviewing candidates (also referred to herein as interviewees). The model-driven candidate-sorting tool analyzes the candidate data for the respective interviewing candidate to identify digital interviewing cues and applies the digital interview cues to a prediction model to predict an achievement index for the respective interviewing candidate. This is performed without reviewer input at the model-driven candidate-sorting tool. The list of interview candidates is sorted according the predicted achievement indices and the sorted list is presented to the reviewer in a user interface. It will be apparent, however, to one of ordinary skill in the art having the benefit of this disclosure, that embodiments of the present invention may be practiced without these specific details. In some instances, well-known structures and devices are shown in block diagram form, rather than in detail, in order to avoid obscuring the embodiments of the present invention.

Now with the ability to recruit for positions nationally and even internationally using the Internet, the number of qualified candidates can sometimes be expensive and time consuming to evaluate. For more technical positions, subject-matter experts are used for evaluation and screening of candidates rather than focusing on regular job duties. With the adoption of digital video interviewing, the time needed to evaluate candidates is reduced, however, the problem of having too many candidates to filter through still remains.

Historically, job selection and admission have been subjective processes with human evaluators. Numerous studies have shown that evaluators are inconsistent and models built from an evaluator consistently outperform the evaluator's actual judgments. This is because human evaluators are inconsistent with their own scoring and will give more weight on resume items to one applicant over another, or deviate from their own methods, based on personality influences or other factors. There are many achievement related outcomes to consider when selecting for job placement, such as, for example, work advancement, training performance, work performance, or sales targets. Likewise, for admission there are many desired achievement outcomes such as grade point average (GPA), dropout likelihood, research grants, or future placement. Predicting these outcomes during the screening process is a complex task ill-suited for most human evaluators.

Conventional solutions, such as basic thresholds, are relatively crude for candidate filtering. For example, thresholds are chosen to reduce the number of applicants using simple metrics such as GPA, degree level, or specific skill mentions in the resume. Using simple screens allow for many potential applicants to be reduced to a final manageable pool.

The embodiments described herein can be used to address at least two identified problems of candidate selection, namely large candidate pools and increased screening accuracy. The embodiments described herein provide solutions to these problems using an achievement index. In order to predict an achievement index, a historical dataset is gathered over time, linking interview cues to an achievement index assigned by a human reviewer. The achievement index can be many things related to a candidate's performance or achievement after the screening process. For example, the achievement index may be an expected candidate interview score (e.g., 1-5), an expected candidate decision (e.g., yes, no, maybe), work performance, likelihood of first year termination or separation (or any defined period), academic performance, future performance metric that can be assigned to a candidate, or the like. The work performance can be, for example, first-year sales target, training performance (likelihood of passing a licensing examination), work advancement rate, or other performance review metrics. If these achievement index values can be predicted during the screening or admission process they can simultaneously solve both problems. The embodiments described herein may take advantage of new inputs, such as, for example, audio data, video data, user interaction (UX) metrics, which have been unused in digital interview screening, to improve prediction capability. The embodiments describe herein can also use other candidate data that is available, such as test scores, resume items, observed interview behavior, or the like. For example, a resume parsing algorithm can be used to parse the resume data.

The embodiments described herein can identify digital interviewing cues that can be used for inputs into a prediction model for predicting an achievement index. The embodiments described herein describe building a prediction model, training the prediction model, and using the prediction model to predict achievement indices for candidates. The predicted achievement indices can be used to sort a list of candidates for a reviewer. The reviewer can use the sorted list to evaluate a large amount of candidates more effectively and screen candidates with better accuracy based on the predicted achievement indices. It should also be noted that the embodiments described herein can use multiple digital interviewing cues identified one or more digital interview sources, such as audio, video, user interaction, or the like, as inputs into a prediction model to predict an achievement index for candidates. The achievement indices can be used to help a reviewer screen candidates, as well as sort the candidates accordingly to the achievement index.

FIG. 1 is a block diagram of a network architecture 100 in which embodiments of a model-driven candidate-sorting tool 110 may operate. The network architecture 100 may include multiple client computing systems 102 coupled to a server computing system 104 via a network 106 (e.g., public network such as the Internet or private network such as a local area network (LAN)). The network 106 may include the Internet and network connections to the Internet. Alternatively, server 104 and the client 102 may be located on a common Local Area Network (LAN), Personal area network (PAN), Campus Area Network (CAN), Metropolitan area network (MAN), Wide area network (WAN), wireless local area network, cellular network, virtual local area network, or the like. The server computing system 104 (also referred to herein as server 104) may include one or more machines (e.g., one or more server computer systems, routers, gateways) that have processing and storage capabilities to provide the functionality described herein. The server computing system 104 may execute a model-driven candidate-sorting tool 110. The model-driven candidate-sorting tool 110 can perform various functions as described herein and may include an prediction model 112 (also referred to herein as an achievement index (AI) prediction model 112) for predicting achievement indices for candidates and cue generator(s) 114 for generating digital interviewing cues from the digital interviewing data, as described in more detail below with respect to FIGS. 2-4. The model-driven candidate-sorting tool 110 can be implemented as a part of a digital interviewing platform 101, such as the digital interviewing platform developed by HireVue, Inc. Alternatively, the digital interview platform 101 may be other types of digital interview platforms. In other embodiments, the model-driven candidate-sorting tool 110 can be implemented as a standalone tool that interfaces with the digital interviewing platform 101 or other systems. It should also be noted that in this embodiment, the server computing system 104 implements the model-driven candidate-sorting tool 110, but one or more of other clients may also include client modules of the model-driven candidate-sorting tool 110 that can work in connection with, or independently from the functionality of the model-driven candidate-sorting tool 110 on the server computing system 104.

The client computing systems 102 (also referred to herein as "client 102") may be a client workstation, a server, a computer, a portable electronic device, an entertainment system configured to communicate over a network, such as a set-top box, a digital receiver, a digital television, a mobile phone, a smart phone, a tablet, or other electronic devices. For example, portable electronic devices may include, but are not limited to, cellular phones, portable gaming systems, portable computing devices or the like. The client 102 may have access to the Internet via a firewall, a router or other packet switching devices. The clients 102 may connect to the server 104 through one or more intervening devices, such as routers, gateways, or other devices. The clients 102 are variously configured with different functionality and may include a browser 140 and one or more applications 142. In one embodiment, the clients 102 accesses the digital interviewing platform 101 via the browser 140 and the digital interviewing platform 101 is a web-based application or a cloud computing system that presents user interfaces to the client 102 via the browser 140. Similarly, one of the applications 142 can be used to access the digital interviewing platform 101. For example, a mobile application (referred to as "app") can be used to access one or more user interfaces of the digital interviewing platform 101. The digital interviewing platform 101 can be one or more software products that facilitate the digital interview process. For example, in some cases, the client 102 is used by a candidate (or interviewee) to conduct a digital interview. The digital interviewing platform 101 can capture digital interview data 132 from the candidate and store the data in a data store 130. The digital interview data 132 can include data uploaded by the candidate, audio captured during the interview, video captured during the interview, data submitted by the candidate before or after the interview, or the like. The client 102 can also be used by a reviewer or evaluator to review, screen and select candidates. The reviewer can access the digital interviewing platform 101 via the browser 140 or the application 142 as described above. The user interfaces presented to the reviewer by the digital interviewing platform 101 are different than the user interfaces presented to the candidates. The user interfaces presented to the reviewer permit the reviewer to access the digital interview data for reviewing and selecting the candidates. The model-driven candidate-sorting tool 110 can be activated by the reviewer (or automatically activated when enabled) to sort candidates for ordering a list of candidates, screening a list of candidates or for other reviewing purposes, as described herein.

The data store 130 can represent one or more data repositories on one or more memory devices. The data store 130 may be a database or any other organized collection of data. The data store 130 may store the digital interview data 132, digital interview cues 134 generated by the cue generator(s) 114 (as described herein), historical cue data 136, and an achievement index (AI) prediction model 138.

Figure 2:
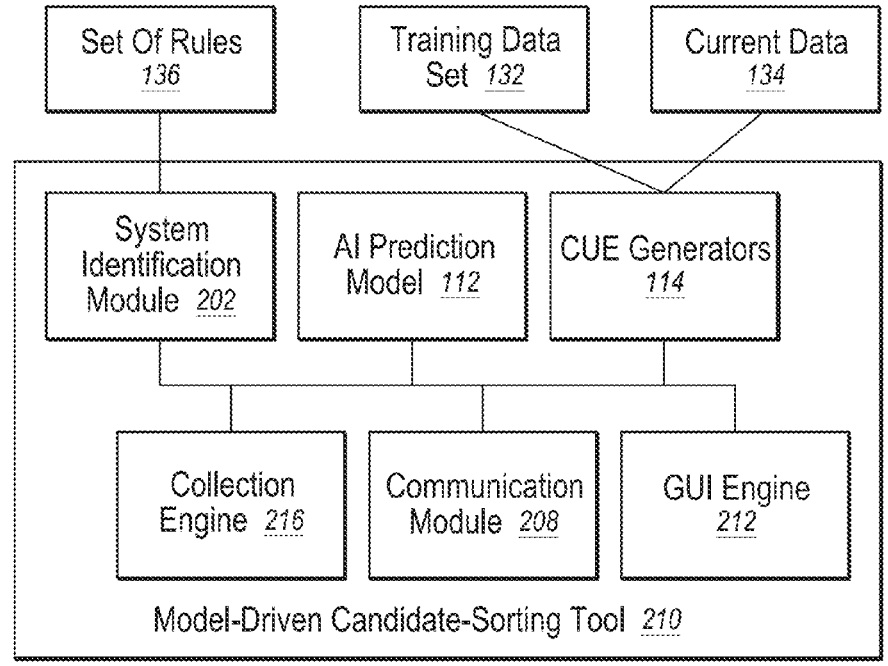
FIG. 2 is a block diagram of a model-driven candidate-sorting tool according to one embodiment.
Figure 3:
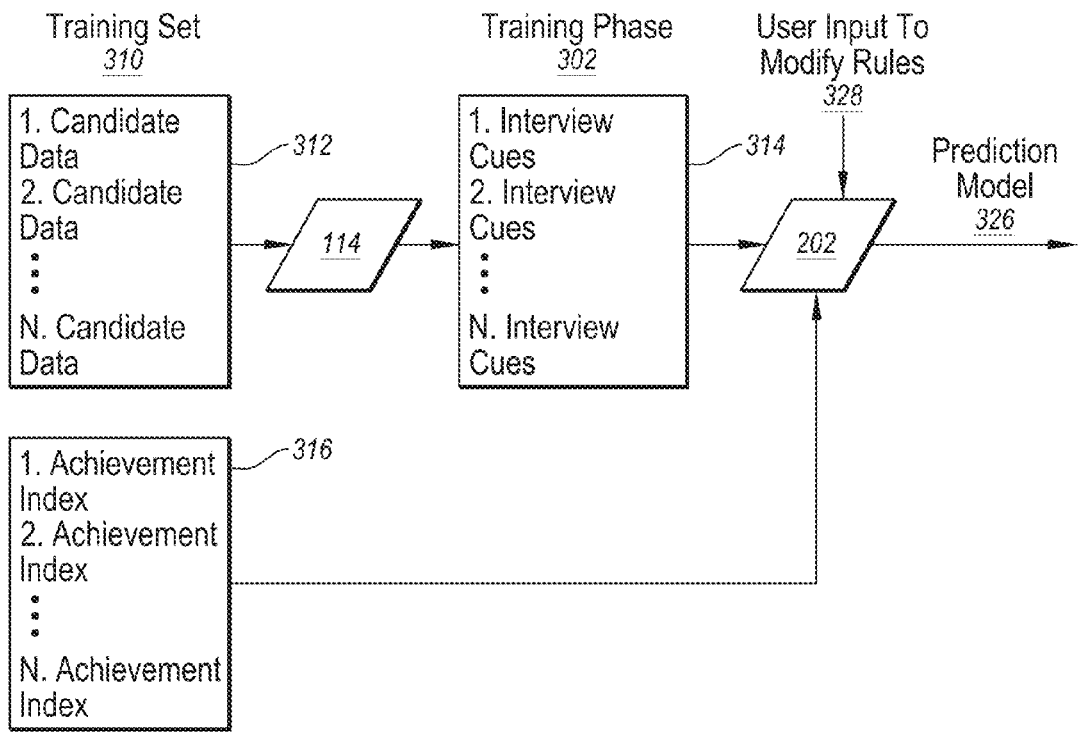
FIG. 3 illustrates a training phase of a system identification module of a model-driven candidate-sorting tool to build a prediction model for interview cues according to one embodiment.
Figure 4:
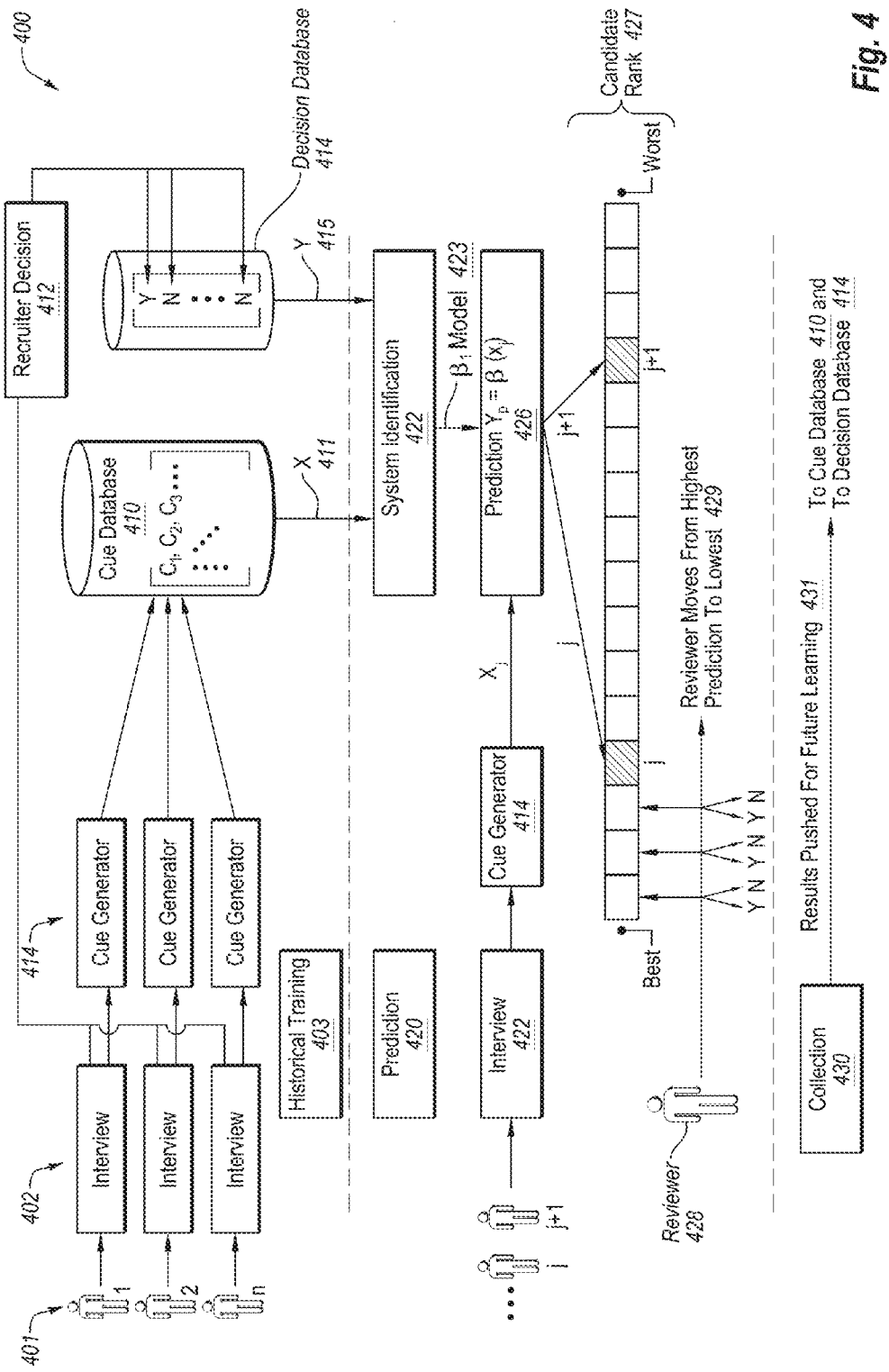
FIG. 4 illustrates an embodiment of historical training and prediction for model-driven candidate sorting according to one embodiment.

In the depicted embodiment, the server computing system 104 may execute the digital interviewing platform 101, including the model-driven candidate-sorting tool 110 for sorting candidates in one or more views of the digital interviewing platform 101, as described in further detail in conjunction with FIGS. 2-4. The server 104 can include web server functionality that facilitates communication between the clients 102 and the digital interviewing platform 101 to conduct digital interviews or review digital interview as described herein. Alternatively, the web server functionality may be implemented on a separate machine than the model-driven candidate-sorting tool 110. It should also be noted that the functionality of the digital interview platform 101 for recording the digital interview data 132 can be implemented on one or more servers 104 and the functionality of the digital interview platform 101 can be implemented one or more different servers 104. In other embodiments, the network architecture 100 may include other devices, such as directory servers, website servers, statistic servers, devices of a network infrastructure operator (e.g., an ISP), or the like. Alternatively, other configurations are possible as would be appreciated by one of ordinary skill in the art having the benefit of this disclosure.

FIG. 2 is a block diagram of a model-driven candidate-sorting tool 210 according to one embodiment. The model-driven candidate-sorting tool 210 (hereinafter referred to as "candidate-sorting tool 210" for ease of description) can be implemented as processing logic comprising hardware (circuitry, dedicated logic, etc.), software (such as is run on a general purpose computing system or a dedicated machine), firmware (embedded software), or any combination thereof. In the depicted embodiment, the model-driven candidate-sorting tool 210 includes a system identification module 202, the AI prediction model 112, cue generators 114, a communication module 208, a graphical user interface (GUI) engine 212, and a collection engine 216. The components of the model-driven candidate-sorting tool 210 may represent modules that can be combined together or separated into further modules, according to some embodiments. The model-driven candidate-sorting tool 210 may include more or less components than those depicted in FIG. 2.

Before the model-driven candidate-sorting tool 210 is used on current data 234, the candidate-sorting tool 210 can develop the AI prediction model 112 and train the AI prediction model. To build the AI prediction model 112, the candidate-sorting tool 210 obtains a training data set 232 of historical digital interview data. The cue generator(s) 114 of the candidate-sorting tool 210 analyze the training data set 232 to identify digital interview cues. The cue generators 114 can identify different types of digital interview cues from various sources, such as from the candidate data submitted to the digital interviewing platform, audio data, video data, user interaction (UX) data, biographies from third-party websites, or the like. The different types of digital interview cues may be audio cues, video cues, user interaction cues, or other digital interviewing cues, such as personal candidate data (e.g., resume data, candidate publications, GPA, test scores, or the like). In some embodiments, the cue generators 114 include one or more audio cue generators, one or more video cue generators, and one or more user interaction generators to individually generate a specific type of digital interview cue. Alternatively, the cue generators 114 include a set of one or more rules to be analyzed while processing the training data set 232. The same cue generators 114 can be used on the current data 234.

As described herein, the digital interview cues can be derived, identified, or generated from various sources of candidate data. The digital interview cues can be pre-interview cues from pre-interview sources, such as data from HTTP user agent data (e.g., browser, operating system (OS), or internet protocol (IP)), from resume parsing (e.g., education, GPA, internships, publications, etc.), from user interaction (UX)/user interface (UI) data, such as proper form filling, efficient behavior, like words per minute (WPM) and how quickly the candidate navigates the digital interviewing platform 101. The pre-interview data may also be third-party candidate data from social media websites, blogs, or the like. For example, the pre-interview data can be obtained from the candidate's profiles on the LinkedIn, Facebook, GILD, Github, Instagram, Twitter or other third-party websites. The pre-interview data may also include user account data (e.g., email address, email host, or the like). The pre-interview data may also include candidate data from previous positions in the digital interviewing platform. For example, performance information from previous interviews by the candidate can be used to predict future performance by the candidate. In one embodiment, the cue generator 114 collects timing data from the training data set 232 (or the current data 234), and determines a time metric representative of the respective interviewing candidate's timeliness on starting and completing an interview, and/or determines whether the respective interviewing candidate missed a deadline or requested additional time to complete the interview. In another embodiment, the cue generator 114 can inspect a log of user interactions to identify the user interaction cues. Alternatively, the cue generator 114 generators other timing interview cues.

In another embodiment, the interviewing cues can be post-interview cues, such as timing data, audio data, video data, or the like. The timing data may include information about how timely the candidate was on starting the interview, completing the interview, or total interview duration. The timing data may also include information to indicate whether the candidate requested additional time due to a missed deadline or other timing information about time-sensitive parameters set for the interview. The cue generator 114 can inspect an audio signal or audio samples of the candidate data to identify the audio cues for a candidate. In one embodiment, the cue generator 114 includes an audio cue generator that collects audio data from the training data set 232 (or current data 234) and identifies utterances in the audio signal of a digital interview by a candidate. An utterance is a group of one or more words spoken by a candidate in the digital interview. The audio cue generator generates the audio cues based on the identified utterances. In another embodiment, the audio generator can alternatively or additional generate audio cues based on gaps between the identified utterances. In another embodiment, the audio cue generator can analyze the raw audio data to determine summary statistics (e.g., maximum, minimum, median, skew, standard deviation, mode, slope, kurtosis, or the like) on the utterances, summary statistics on the gaps between utterances, utterance repetition metrics (e.g., condition of utterance power spectrum density (PSD) function), a frequency spectral analysis (e.g., performing Fast Fourier Transform (FFT) variants on the sound spectrum to generate frequency statistics), mood detection (e.g., aggression, distress, engagement, motivation, or nervousness), or the like. In another embodiment, the audio cue generator can generate audio cues based on voice-to-text data. For example, the voice-to-text data may include grammar scoring. In one embodiment, a Linux command line tool diction can determine the number of commonly misused phrases, double words, and grammar errors, and these numbers can be normalized by the number of sentences detected). The voice-to-text data may also include positive or negative sentiments that can be generated from text data where weights are given to each word, or tuple (groups) of words, to determine an overall mood of the text. Black list word clouds (racist, swearing, vulgarity), summary statistics on word length (e.g., character count or syllable count), summary statistics on word difficulty, and filler-word frequency can also be types of voice-to-text data that can be analyzed for digital interviewing cues. For example, a dictionary can be used to map a word with a difficulty rating to allow grammar depth to be tested. Additional details on audio cue generation are described below with respect to FIGS. 9-13.

The cue generators 114 can inspect a video signal to identify the video cues for a candidate. In one embodiment, the cue generators 114 include a specific video cue generator to identify the video cues based on the video data. In one embodiment, the video cue generator determines video metrics in video data of the digital interview by a candidate. The video cue generator generates the video cues based on the video metrics. The video metrics may include heart rate detection (e.g., using Eulerian video magnification), candidate facial expression (e.g., smiling, confusion, agitation), eye movement data, environment data (e.g., how cluttered in the background, how private is the environment), or candidate movement data (e.g., what temporal frequencies is the candidate moving in, what is the jitter frequency, or the like).

In one embodiment, the cue generators 114 are used when developing the prediction model 112. In another embodiment, the cue generators 114 generate the digital interview cues in the data store 130 to be retrieved later when developing a prediction model at a subsequent time. In one embodiment, the system identification module 202 of the candidate-sorting tool 210 gathers a historical data set of interview cues and links the interview cues of the historical data set to the achievement index. In another embodiment, the system identification module 202 obtains a historical data set of interview cues and stores the historical data set of interview cues in a cue matrix, where rows of the cue matrix represent one of the candidates and columns represent each of the interview cues. The system identification module 202 stores past achievement indices of the candidates in an achievement score vector. The system identification module 202 builds the prediction model 112 using the cue matrix and the achievement score vector. In one embodiment, to solve the linear system to build the predictive mode using a system identification algorithm, the system identification module 202 receives two inputs for the system identification algorithm including the cue matrix (x) and the achievement score vector (y). The system identification algorithm may be represented by $y=F(x)$, where F is the predictive model, $\beta$ (beta), being built. To solve for the linear system where $F=\beta$ (beta), the model could be represented as follows: $\beta$ (beta), $=pinv(X*X')*X'*y$, where "pinv" is the pseudoinverse of a matrix (e.g., Moore-Penrose pseudo-inverse. In one embodiment, the system identification algorithm is a support vector machine. Alternatively, the system identification algorithm may be regressions, neural networks, tree-structure classifiers, symbolic regression using genetic programming, or any other grey or black box models. Once the prediction model 112 is built, the candidate-sorting tool 210 can training the prediction model 132 using the training data set 232 as described in more detail below with respect to FIG. 3. It should be noted that in some embodiments described herein an overall model can be built. In other embodiments, a position specific or sector specific model can be build. For example, a predictive model for sales or a predictive model for engineering can be independently built. Similarly, a position-specific model can be built. Also, in other embodiments, an evaluator-specific model can be built. For example, two evaluator-specific models can be built for two evaluators (A and B), allowing each to predict an order in which to evaluate candidates based on the achievement indices from the respective models. It should also be noted that additional observations may be available in the data that can be used to build specific predictive models based on those observations.

The training data set 232 may be any candidate data that is already available about candidates, as well as a corresponding achievement index for the candidate (e.g., did this candidate get hired). For example, the achievement index may be an expected candidate interview score (e.g., 1-5), an expected candidate decision (e.g., yes, no, maybe), a work performance metric, a metric indicative of a likelihood of termination or separation after a defined period, an academic performance metric (e.g., GPA, test scores, likelihood of completion, funding success, cumulative citation factor), a future performance metric that can be assigned to a candidate, or the like. The work performance can be, for example, first-year sales target, training performance (likelihood of passing a licensing examination), work advancement rate, or other performance review metrics. The achievement index may be indicative of a candidate's chance of success to be hired or a candidate's chance for achievement after the screening process.

As described herein, the digital interview cues can be determined for the current data 234 by the cue generators 114 and the digital interview cues can be applied to the AI prediction model 112 to predict an achievement index for a list of current candidates. The list of candidates can be sorted and displayed to a reviewer via the GUI engine 212. The GUI engine 212 can create a GUI with input mechanisms to review the training data set 232, the set of rules 236 for the system identification module 202, constraints or parameters on the AI prediction model 112, cue generators 114, system identification module 202, collection engine 216, or other aspects of the model-driven candidate-sorting tool 210. The GUI engine 212 can also create other user interface mechanisms to facilitate selection of rules, modification of rules, categories, data item properties, or the like. The GUI engine 212 can also provide a visual representation of the data to display to the administrator. In some embodiments, the GUI engine 212 is used when displaying the GUI on the same device in which the model-driven candidate-sorting tool 210 is implemented. In another embodiment, the GUI engine 212 can be used in connection with a web server that creates and displays a webpage to be sent to another device for display. The GUI engine 212 can also generate a GUI for reviewers within the digital interviewing platform 101, such as when viewing a list of potential candidates. For example, the reviewer can view of list of candidates and activate a user interface element to activate AI sorting that sorts the candidates by achievement index. The GUI engine 212 then presents the sorted list of candidates based on the achievement indices that have been predicted by the prediction model 112.

In another embodiment, the candidate-sorting tool 210 can communicate the predicted achievement indices to other components of the digital interviewing platform 101 using the communication module 208. The communication module 208 can also be used to communicate with other components within the model-driven candidate-sorting tool 210, or within the server computing system 104, or with components or devices coupled to the server computing system 104. Once the achievement indices have been determined by the prediction model 112 and interview cues generated by the cue generators, the achievement indices and interview cues can be collected by the collection engine 216 to be used as historical data for developing additional prediction models or for updating the current prediction model 112.

The embodiments of the candidate-sorting tool 210 can use the digital interview cues as inputs to the prediction model 112 for predicting an achievement index of a candidate. Conventionally, resume data and candidate data could be used for screening. The embodiments described herein can combine these conventional types of data with the automated digital interview cues generated by the cue generators 114 to obtain a much larger number of automated cues. Using these cues, prediction models can be generated to predict a wide variety of achievement indices automatically without reviewer input. This may allow for achievement predictions to be made about the interview mechanically before a human needs to review the interview. Described herein are various potential interview cues that can be generated or identified to provide a rich data set for digital interviewing when attempting to predict candidate outcomes.

FIG. 3 illustrates a training phase 302 of a system identification module 202 of a model-driven candidate-sorting tool 210 to build a prediction model 326 for interview cues according to one embodiment. During the training phase 302, a training data set 310 is identified. The training data set includes candidate data 312 for multiple candidates. The candidate data may include audio files, video files, or other data files with information about candidates, as well as audio and/or video from the interview itself. The candidate data 312 can be captured by the digital interviewing platform 101 described herein. Alternatively, the candidate data 312 can be obtained from various sources as described herein. The candidate data 312 of the training data set 310 is input into the cue generator(s) 114 to generate corresponding interview cues 314 for the candidates. The interview cues can be organized in columns of a cue matrix, where each row represents a candidate and the columns store the interview cues 314 generated by the cue generator(s) 114. The training data set 310 also include historical achievement index data 316 for the respective candidates. As described herein, the achievement index data 316 can be stored in a score vector. Both the interview cues 314 and the achievement indices 316 are input into the system identification module 202 to develop a prediction model 326. The system identification module 202 can be governed by rules input 328 by an administrator responsible for building the prediction model 326. The user input 328 can include a set of rules 236. The set of rules 236 can be rules of a system identification algorithm that builds the prediction model 326 based on the historical interview cues 314 and achievement indices 316 of the training set 310. Once the prediction model 326 is developed, it can be further trained by testing additional data in the training set 310. This can allow the administrator to adjust the set of rules 236 of the algorithm being used using the user input 328. For example, an administrator of the model-driven candidate-sorting tool 210 can analyze the results to assess whether the set of rules 236 needs any modification. If modifications are needed, the system identification module 202 can receive user input 328 to modify the one or more of the rules. This can be an iterative process. Once the training phase is completed, the set of rules can be applied to the current data 234 to predict achievement indices for current candidates.

In one embodiment, the system identification module 202 and cue generators 114 can be collectively or individually implemented in one or more machine learning algorithms. The machine learning algorithm can analyze the training data set 232 with a set of initial rules 236 and develop and train the prediction model 326 for the achievement indices 316 can be used by the model-driven candidate-sorting tool 210 to develop and train the prediction model 326. The set of rules 236 and other parameters of the machine learning algorithm can be presented to the administrator via the GUI engine 212.

FIG. 4 illustrates an embodiment of a process flow 400 of historical training and prediction for model-driven candidate sorting according to one embodiment. The process flow 400 starts with historical training 403. During historical training 403, past candidates 401 participated in their respective digital interviews 402. For example, the candidates 401 participated in a digital interview hosted by the digital interviewing platform 101. The digital interviewing platform 101 captured the candidate data and stored the candidate in a database. The candidate data from the interviews 402 are analyzed by cue generators 414 to identify digital interviewing cues as described herein. The digital interviewing cues are stored in a cue database 410 for the respective candidates. For example, the cue database 410 can be a cue matrix that defines rows for the past candidates 401 and the columns define digital interviewing cues for the respective candidate. The cue matrix can be considered one input 411, x, to the system identification algorithm 424. During the past interviews 402, a reviewer of the interviews made a decision 412, such as a hiring decision. The decision 412 is stored in another decision table 416. The decision table 416 can be represented with numerical values to represent the decision 412. The decision table 416 can be considered as a second input 415, y, to the system identification algorithm 424.

During a prediction phase 420, the system identification algorithm 424 generates a prediction model 423 based on the two inputs x 411, y 415, representing the cue database 410 and the decision table 416. The prediction model 423 is used as an input to a prediction algorithm 426. Also, during the prediction phase 420, current candidates 421 participate in digital interviews 422. These interviews can be conducted in the digital interviewing platform 101 as described above. The candidate data from the current interviews 422 are input into the cue generators 414 to identify digital interviewing cues for the candidates. The identified digital interviewing cues are input into the prediction algorithm 426 to predict achievement indices for the current candidates 421. A candidate rank 427 is assigned to the candidates 421 based on the predicted achievement indices. A reviewer 428, when evaluating the current candidates 421 is presented with the candidate data in a sorted view based on the candidates' rank 427. The reviewer 428 can review the candidates from a highest prediction to a lowest prediction 429 and make a decision for the current candidates 421. In a further embodiment, a collection engine 430 can collect the results from the current candidates and store the digital interviewing cues and decision results into the cue database 410 and the decision table 416 for future learning 431.

FIG. 4 demonstrates the relationship between the historical interview training and the prediction. Thousands of candidates are interviewed and decisions are made by evaluators on candidate achievement. For each interview, digital interview cues can be generated using the audio and video data coupled with the resume and other available data. This data is saved in a cue database along with the candidate decisions and can be pulled to build a model, β. New candidates that are interviewed are able to have cues generated automatically and an achievement prediction is made before a human reviewer watches the interview. These interviews are placed back into the candidate pool and sorted from best to worst predictions. Now evaluators can evaluate candidates in a more efficient order, starting with the candidates with the highest achievement prediction and working towards the lower ranking candidates. After candidates are scored, these interviews can now be used for future training.

Figure 5:
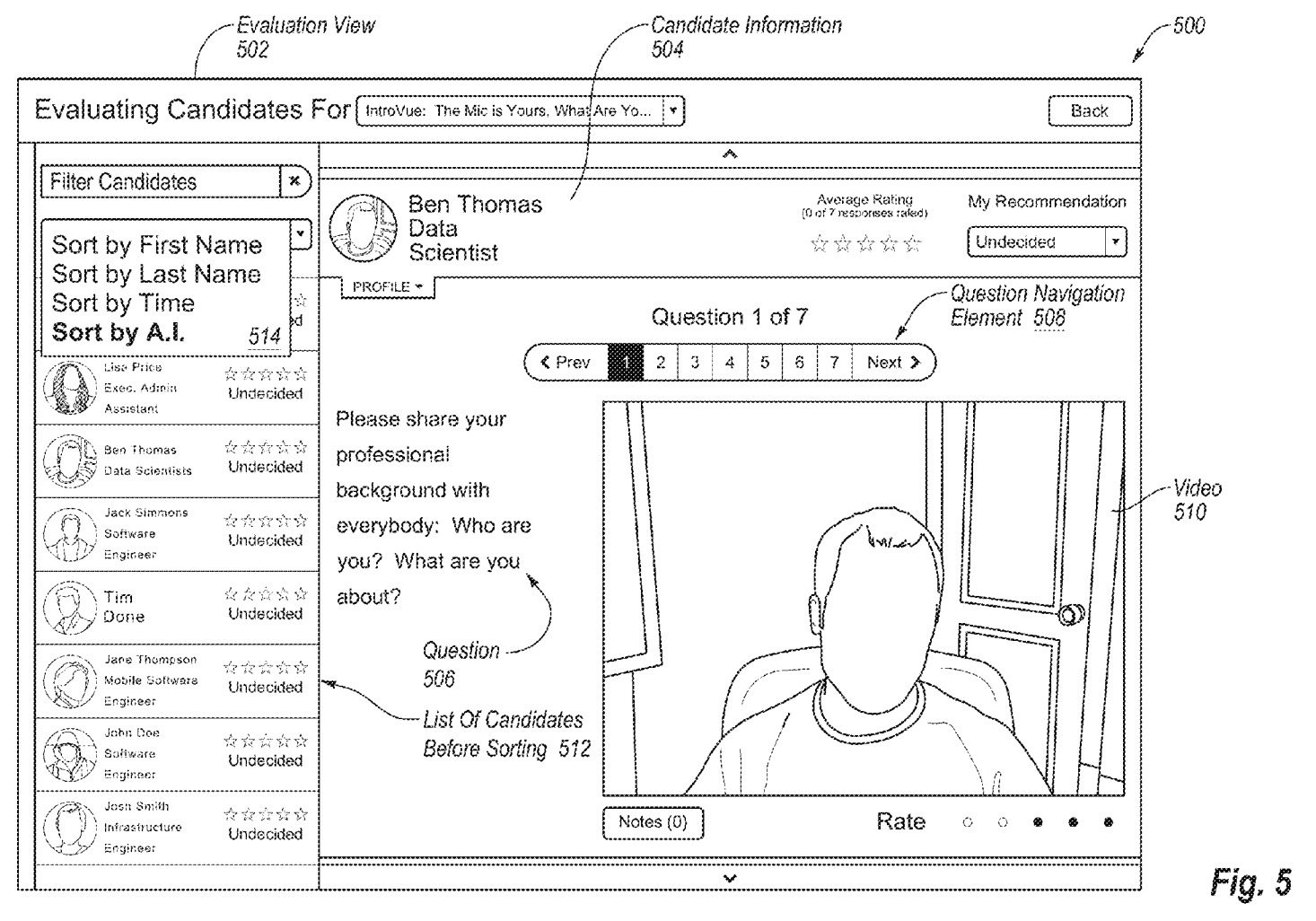
Figure 6:
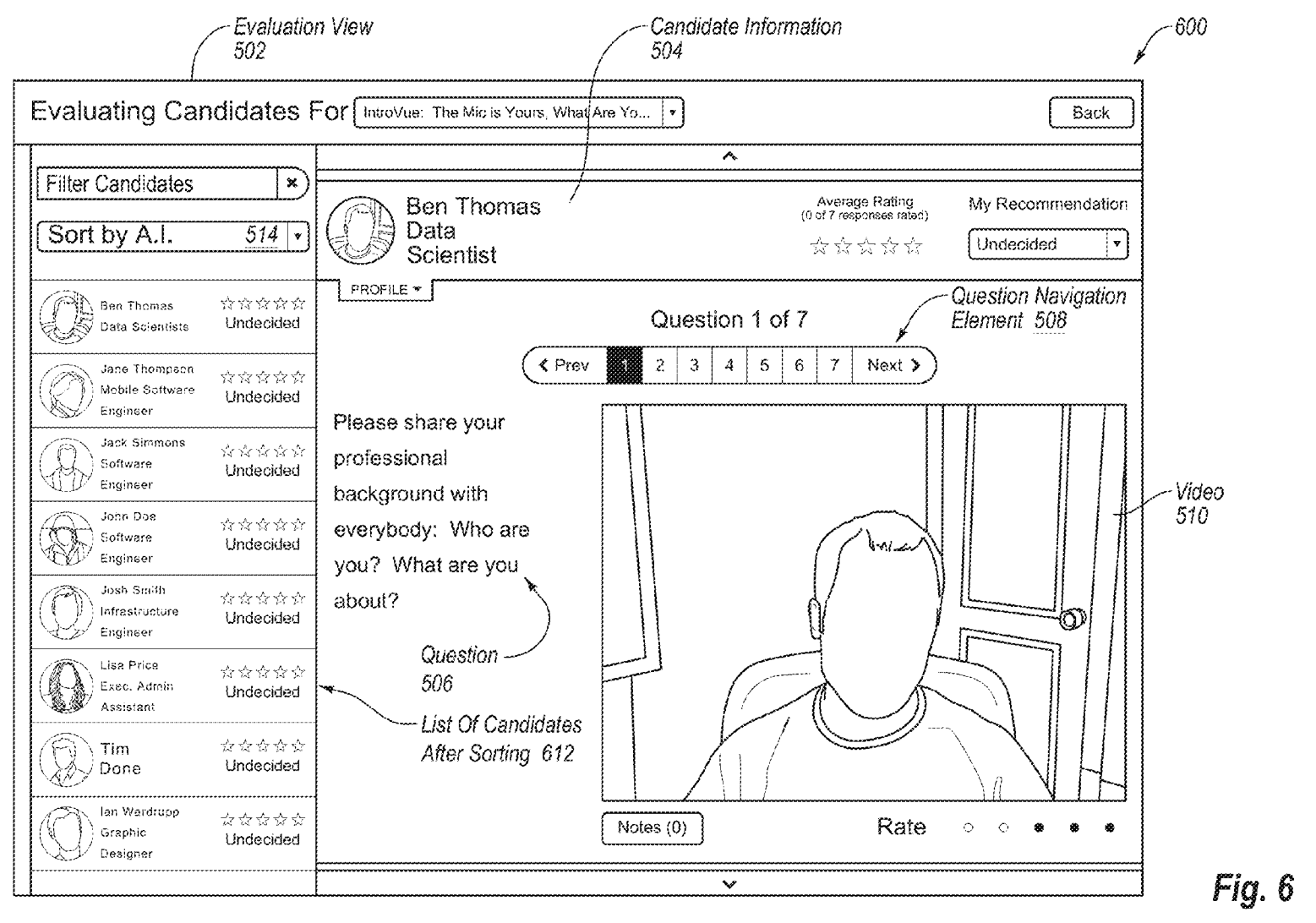

FIG. 5 is an exemplary user interface 500 for viewing digital interviews before model-driven candidate sorting according to one embodiment. The user interface 500 may be an evaluation view 502 of a digital interviewing platform 101. The evaluation view 502 includes candidate information 504, a question 506, a question navigation element 508, a video panel 510, a list of candidates 512, and a sorting element 514. The list of candidates 512 can be sorted by first name, last name, time, or achievement index (A.I.). For example, as illustrated in FIG. 5, the list of candidates 512 is not sorted, or possibly sorted based on one of the other items. When a reviewer activates the sorting element 514, such as clicking the sorting element 514, the list is sorted based on the predicted achievement indices described herein. For example, as illustrated in the user interface 500 of FIG. 6, the evaluation view 502 presents the sorted list of candidates 612, where the candidates are rearranged in order of the achievement indices. A reviewer can then start his or her review of the list of candidates 612 in a meaningful manner based on the predictions, instead of in some other arbitrary order, or based on names or times. For example, a reviewer can store the candidates in the digital hiring platform by a custom AI prediction such as, for examples, interview decision, interview score, workplace performance, GPA, or future test scores. The trained AI could vary based on the hiring or screening goals and could also vary by industry (i.e., workplace performance prediction for finance could be very different than a model built on sales workplace performance data).

Figure 7:
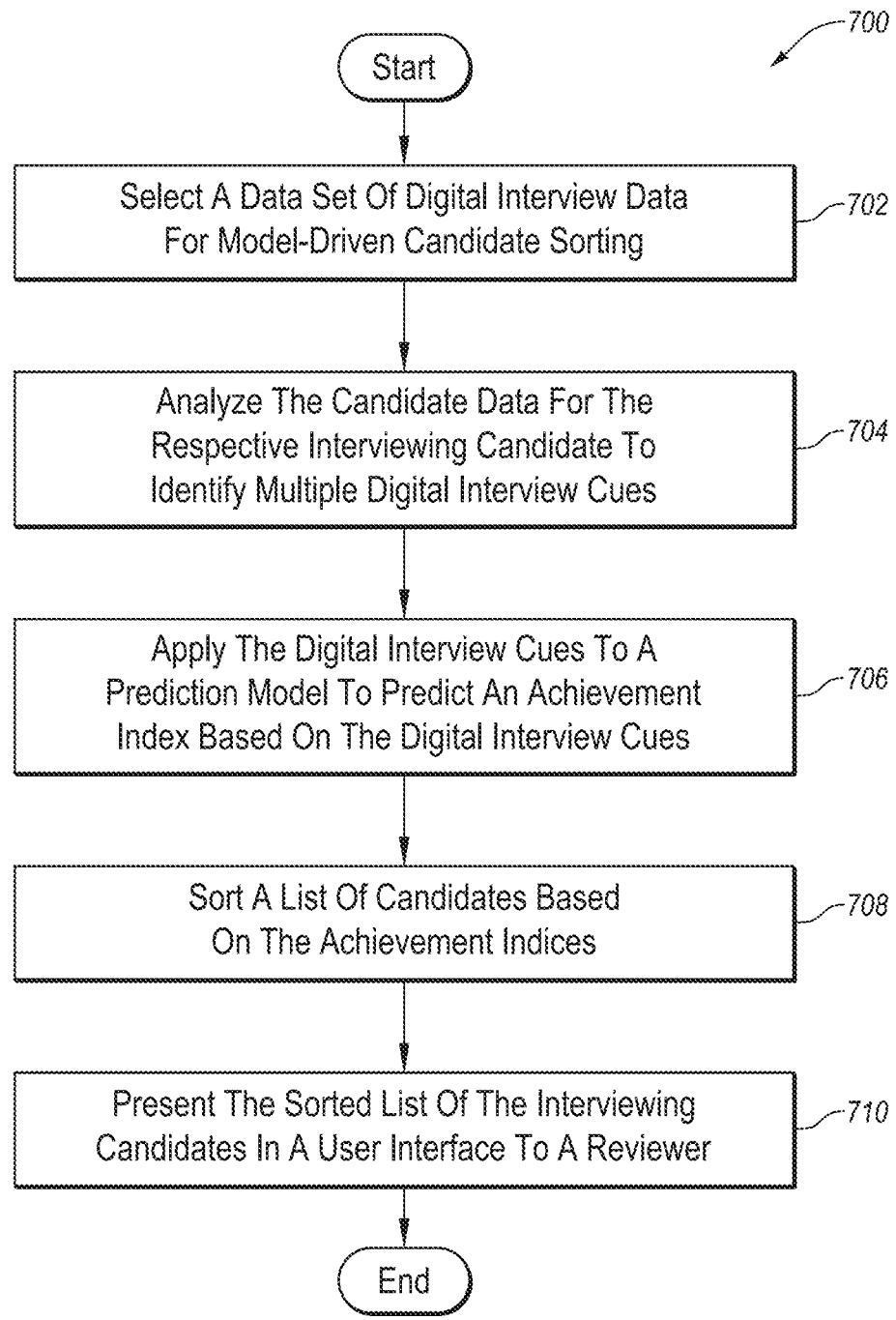
FIG. 7 is a flow diagram of a method of model-driven candidate sorting for evaluating digital interviews according to one embodiment.

FIG. 7 is a flow diagram of a method 700 of model-driven candidate sorting for evaluating digital interviews according to one embodiment. The method 700 is performed by processing logic that may comprise hardware (circuitry, dedicated logic, etc.), software (such as is run on a general purpose computing system or a dedicated machine), firmware (embedded software), or any combination thereof. In one embodiment, the model-driven candidate-sorting tool 110 of FIG. 1 performs the method 700. In another embodiment, the model-driven candidate-sorting tool 210 performs the method 700. Alternatively, other components of the server computing system 104, client-computing system 102, or both can perform some or all of the operations of method 700.

Referring to FIG. 7, processing logic begins with selecting a data set of digital interview data for model-driven candidate sorting (block 702). The data set includes candidate data recorded for multiple interviewing candidates. For each interviewing candidate, the processing logic analyzes the candidate data for the respective interviewing candidate to identify multiple digital interviewing cues (block 704). The processing logic applies the digital interviewing cues to a prediction model to predict an achievement index based on the digital interviewing cues identified for the respective interviewing candidate (block 706). It should be noted that the prediction can be automated. That is the digital interview cues can be applied to the prediction model to predict the achievement index without reviewer input. The processing logic sorts a list of interviewing candidates based on the predicted achievement indices (block 708). The processing logic presents the sorted list of interviewing candidates in a user interface to a reviewer (block 710).

In another embodiment, the processing logic assigns a candidate rank to the candidates based on the achievement indices. This may be stored for subsequent evaluation of the candidates by the reviewer. When evaluating the candidates, a reviewer is presented with the candidate data in a sorted view or in a view in which the candidate data is sorted based on the candidate rank.

In another embodiment, the digital interviewing cues include audio cues and the processing logic analyzes the candidate data by inspecting an audio signal of the candidate data to identify the audio cues. In another embodiment, the digital interviewing cues include video cues and the processing logic analyzes the candidate data by inspecting a video signal of the candidates data to identify the video cues. In another embodiment, the digital interviewing cues include user interaction cues and the processing logic analyzes the candidate data by inspecting a log of user interactions to identify the user interaction cues. In another embodiment, the digital interviewing cues include one or more of the audio cues, video cues, or user interaction cues, and the processing logic can identify additional digital interviewing cues, such as personal candidate data, such as resume data, candidate publications, GPA, test scores, or the like.

In a further embodiment, the processing logic determines an additional achievement index from the prediction model based on one or more other interviewing cues and the processing logic can sort the list of candidates based on the achievement index, the additional achievement index, or any combination thereof.

In another embodiment, the processing logic collects the digital interview data of the data set, such as by collecting post-interview data. The post-interview data may include at least one of timing data, audio data, or video data. In another embodiment, the processing logic collects timing data, such as by determining a time metric representative of the respective interviewing candidate's timeliness on starting and completing an interview or determining whether the respective interviewing candidate missed a deadline or requested additional time to complete the interview.

In another embodiment, as described in more detail below, processing logic collects audio data of a digital interview by the respective candidate and identifies utterances in the audio data by the respective candidate. The utterances each include a group of one or more words spoken by the candidate in the digital interview. The processing logic generates the audio cues of the digital interview based on the identified utterances. In another embodiment, the processing logic collects video data of a digital interview and determines video metrics in the video data and generates the video cues of the digital interview based on the video metrics. The video metrics may include one or more of a heart rate detection, a candidate facial expression, eye movement data, environment data, or candidate movement data, such as body movement data (not just eye movement).

As described herein, the processing logic can present the sorted list in a view of a digital interviewing platform in response to activation of a user interface element for achievement index sorting.

In another embodiment, the processing logic collects pre-interview data, including at least one of user agent data, resume data, user interface data, third-party candidate data, user account data, or candidate data from a previous position.

In another embodiment, the processing logic develops the prediction model by gathering a historical data set of interview cues and liking the interview cues of the historical data set to the achievement index. In another embodiment, the processing logic obtains a historical data set of interview cues, storing the historical data set of interview cues in a cue matrix. The rows of the cue matrix each represent one of multiple past candidates and columns of the cue matrix represent each of the interview cues for the respective candidates (of that particular row). The processing logic stores past achievement indices of the multiple candidates in an achievement score vector. The processing logic builds the prediction model using the cue matrix and the achievement score vector. The cue matrix represents an input matrix of a system identification algorithm and the achievement score vector represents an output matrix of the system identification algorithm. in a further embodiment, the processing logic trains the prediction model. In one embodiment, the system identification algorithm at least one of a support vector machine, regressions, neural networks, tree-structure classifiers, or symbolic regression using genetic programming.

In another embodiment, the achievement index is at least one of an expected candidate interview score, an expected candidate decision, a work performance metric, a metric indicative of a likelihood of termination after a defined period, an academic performance metric, or a future performance metric.

Figure 8:
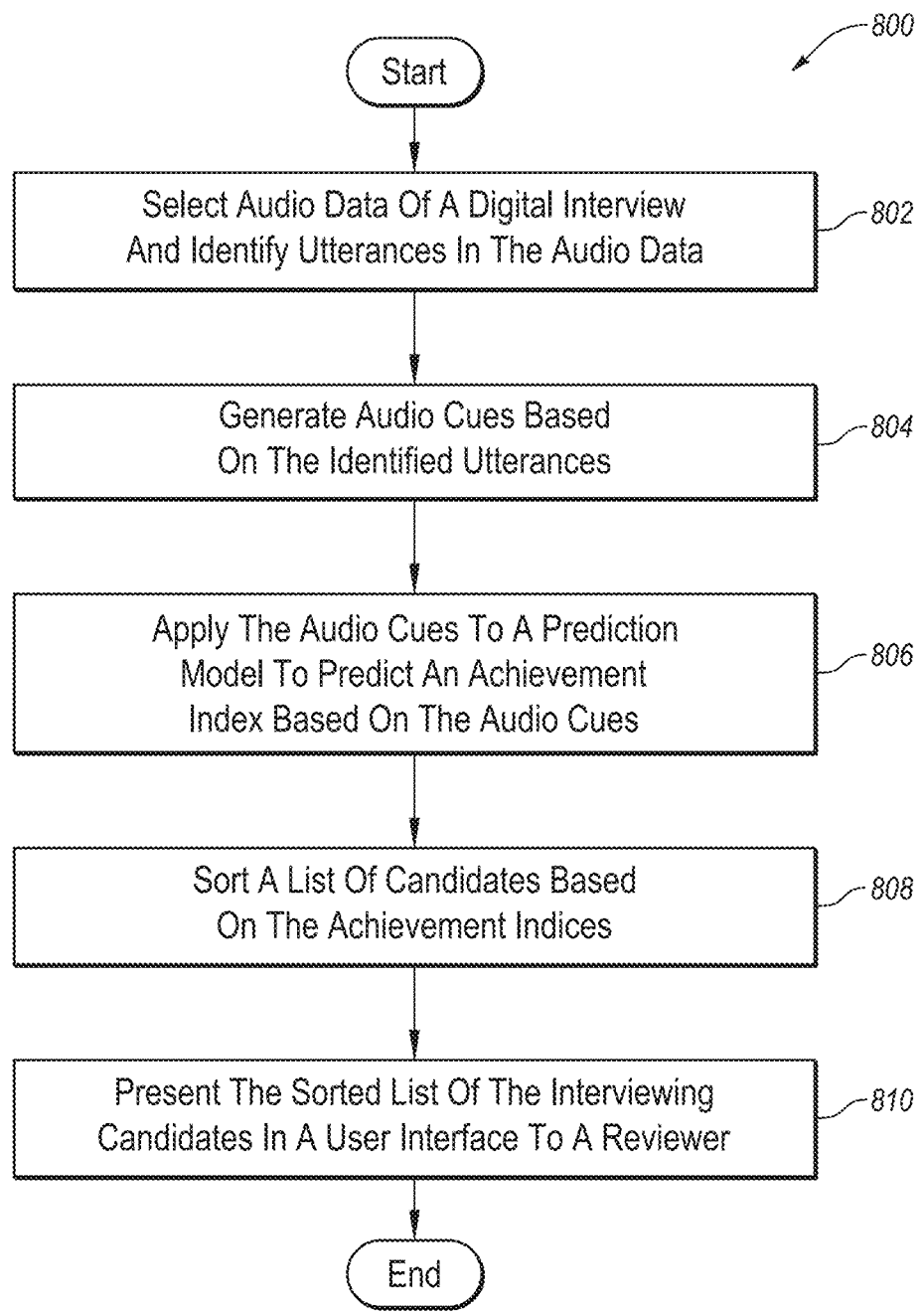
FIG. 8 is a flow diagram of a method for model-driven candidate sorting based on audio cues according to one embodiment.

FIG. 8 is a flow diagram of a method 800 for model-driven candidate sorting based on audio cues according to one embodiment. In one embodiment, the model-driven candidate-sorting tool 110 of FIG. 1 performs the method 800. In another embodiment, the model-driven candidate-sorting tool 210 performs the method 800. Alternatively, other components of the server computing system 104, client-computing system 102, or both can perform some or all of the operations of method 800.

Referring to FIG. 8, processing logic begins with selecting audio data of a digital interview and identifying utterances in the audio data (block 802), such as captured by a digital interviewing platform. The utterances each include a group of one or more words spoken by a candidate in the digital interview. The processing logic generates audio cues of the digital interview based on the identified utterances (block 804). The processing logic applies the audio cues to a prediction model to predict an achievement index for the candidate based on the audio cues (block 806). The processing logic sorts a list of candidates based on the audio cues (block 808) The processing logic displays the candidate in a list of candidates based on the achievement indices (block 810).

In a further embodiment, the processing logic performs blocks 802-806 for multiple candidates to predict additional achievement indices for the additional candidates and sorts the candidate and the additional candidates in the list of candidates according to their respective achievement index.

In one embodiment, the processing logic identifies the utterances by computing a first moving average using a first moving window of a first number of audio samples of the audio data. The processing logic computes a second moving average using a second moving window of a second number of the audio samples with gradients to detect peak transitions of the audio samples. The second number is greater than the first number. The processing logic computes a voice activity indicator of the audio samples and segments the audio samples into the utterances using the first moving average, the second moving average and the voice activity indicator. Each of the utterances includes an utterance length and the processing logic assigns an utterance identifier to each of the utterances.

In another embodiment, the processing logic identifies gaps between the utterances in the audio data. Each of the gaps include a gap length and the processing logic assigns a gap identifier to each of the gaps. The processing logic computes summary statistics on the gaps.

In another embodiment, the processing logic generates an utterance vector including the utterance identifiers and corresponding utterance lengths. The processing logic generates a gap vector including the gap identifiers and corresponding gap lengths. The processing logic computes a ratio of utterance length to gap length using the utterance vector and the gap vector.

In another embodiment, the processing logic performs a spectral analysis of each of the identified utterances and performs at least one of single word or phrase detection or interview fingerprinting based on the spectral analysis.

In another embodiment, the processing logic performs a spectral analysis of each of the identified utterances to generate utterance time-series data and computes summary statistics for each window of a spectrum. The window is defined by wherein each window is defined by a unit step frequency. For example, the unit step frequency may be 500 kHz between 0 and 8 MHz. In another embodiment, the unit step frequency is 1000 kHz. The summary statistics may include at least one of maximum, minimum, median, skew, standard deviation, mode, slope, or kurtosis. In another embodiment, the window can be adjusted during operation, before or after operation, or using other adaptive techniques to adjust the window size, the range, or the like.

In another embodiment, the processing logic performs a spectral analysis of each of the identified utterances to generate utterance time-series data. The processing logic generates a spectral signature of each of the identified utterances based on the spectral analysis. The processing logic detects repetition of utterances based on the spectral signatures.

The processing logic may detect the repetition of utterances by building an utterance matrix to represent the digital interview and interpolating an utterance spectral response to fit within a predefined resolution of columns of the utterance matrix to allow vector combination. The processing logic computes a Euclidean norm of the utterance matrix to estimate repetition and generates an interview repetition score based on the Euclidean norm. In another embodiment, the processing logic computes utterance repetition metrics using the utterance matrix.

In another embodiment, the processing logic generates the audio cues by performing an utterance Power Spectrum Density (PSD) function on the identified utterances data. The processing logic computes an utterance repetition metric based on the PSD function. In another embodiment, the processing logic generates the audio cues by performing Fast Fourier Transform (FFT) variants on a sound spectrum of the audio data for frequency spectral analysis. The processing logic generates frequency statistics based on the frequency spectral analysis. In another embodiment, the processing logic generates the audio cues by performing spectral analysis of each of the identified utterances to obtain an utterance power spectrum density and computes utterance power spectrum density performing at least one of single-word or phrase detection or interview fingerprinting based on the spectral analysis.

In a further embodiment, the processing logic converts the audio data to text. The processing logic generates the audio cues from analyzing the text. The text can be analyzed by any one or more of: calculating a grammar score of the text; calculating a sentiment score of the text, where the sentiment score represents a mood of the text based on weights given to each word or groups of words; calculating a count of words on a black list; calculating summary statistics on word lengths of the text or word difficulty of the text; calculating a frequency of filler words of the text; or calculating position-specific word clusters for predictive words. In another embodiment, the processing logic calculates a clustering word strength metric based on position. In another embodiment, the processing logic calculates a clustering word strength metric based on position.

Using the audio, video, and user data gathered while using the user interface allows for a powerful model to be constructed to predict achievement score. The following description provides additional embodiments regarding various audio metrics that can be used, such as generating utterance metrics.

Figure 9:
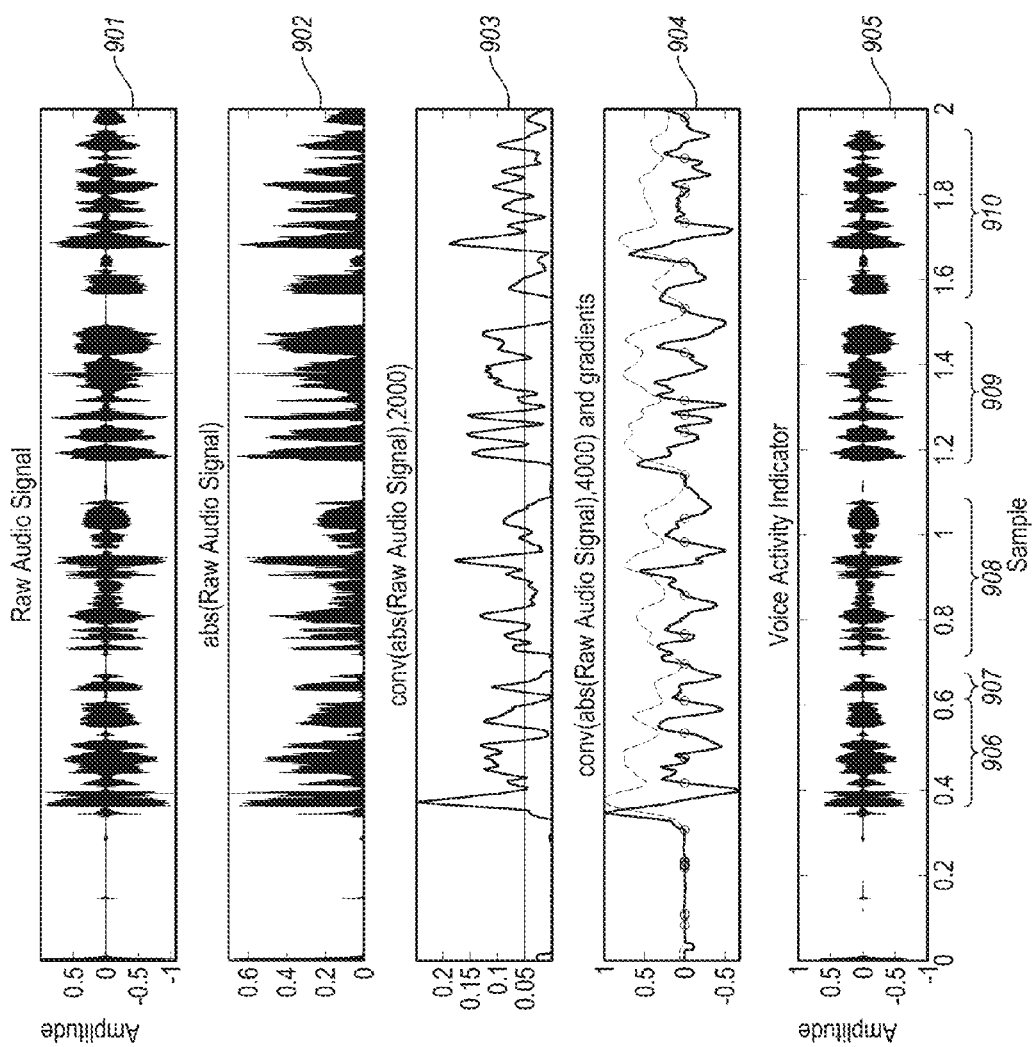
FIG. 9 are graphs of audio signals for utterance identification according to one embodiment.

When a candidate begins interviewing the candidate does not speak in isolated words, but rather in utterances which could include a group of words. These utterances can easily be isolated from the audio data, as illustrated in FIG. 9, and used to generate additional interview cues for the model. The utterances can be a spoken word, a statement, or a vocal sound.

FIG. 9 are graphs 901-905 of audio signals for utterance identification according to one embodiment. Graph 901 shows the raw audio signal from the digital interview. Graph 902 shows absolute values of the raw audio signal. Graph 903 shows a short moving average that uses a moving window size of two thousand samples (e.g., conv(abs(Raw Audio Signal), 2000). Of course, the moving window size can be other sizes than two thousand samples. Graph 904 shows a long moving average that uses a moving window size of four thousand samples with gradients to detect peak detection (e.g., conv (abs(Raw Audio Signal), 4000) and gradients). Graph 905 shows voice activity indicator to illustrate the isolation that is capable. The voice indicators show different audio sequences. For example, the voice activity indicator identifies five audio sequences 906-910.

Figure 10:
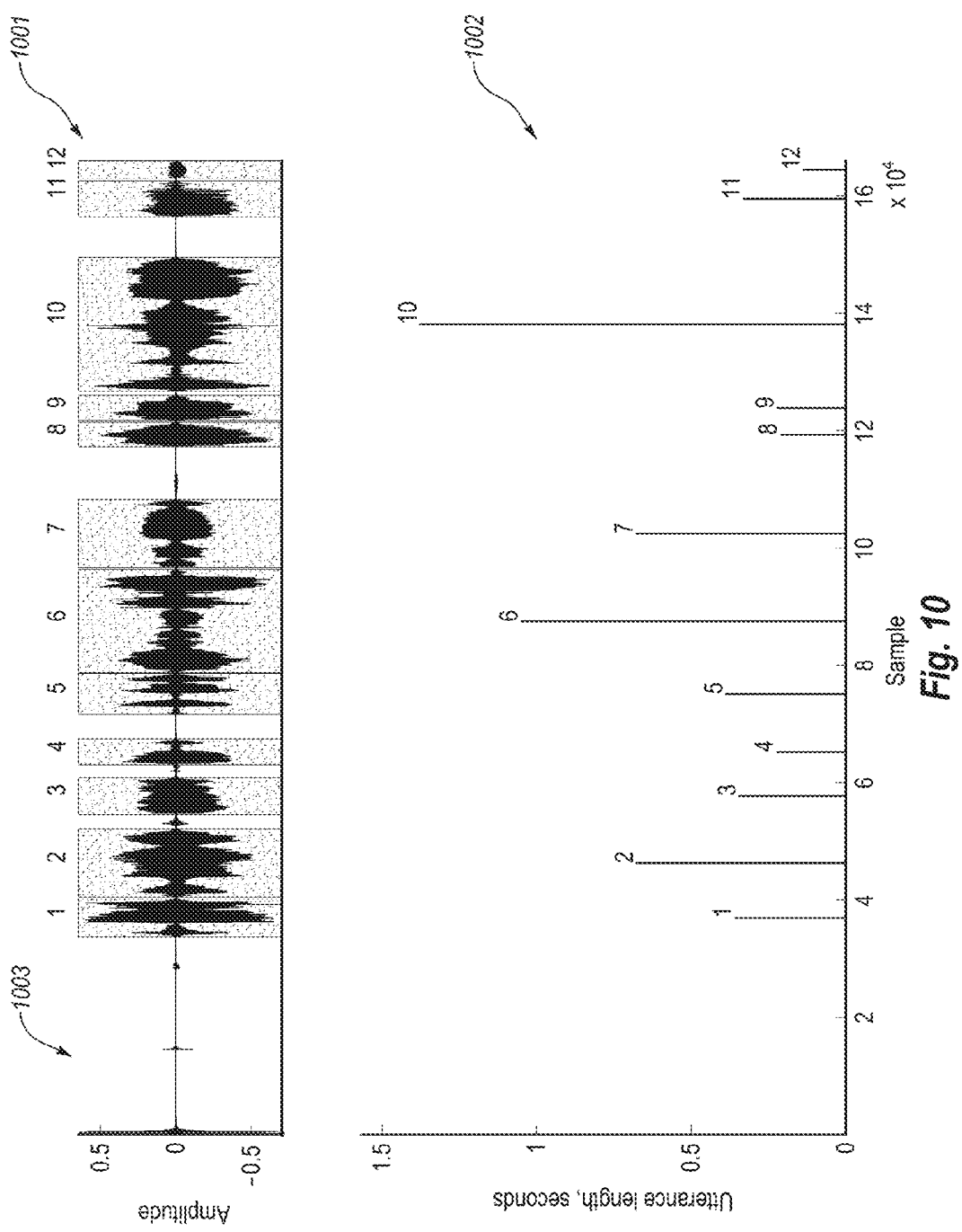
FIG. 10 are graphs of processed audio signals for utterance identification according to one embodiment.

FIG. 10 are graphs 1001-1002 of processed audio signals for utterance identification according to one embodiment. Graph 1001 shows amplitudes of identified utterances 1-12 from a raw audio file. The large gap 1003 at the beginning is before the candidate begins to speak. The numbered sections represent speaking utterances from the candidates with a corresponding utterance identifier (1-12) at the top in the order the utterances occurred. For example, utterance identifiers eight and nine are examples of filler words (e.g., uh, ah, um). The segmentation of the audio source is accomplished using the filters as illustrated in FIG. 9. Graph 1002 shows a plot of magnitudes of the identified utterances and the corresponding utterance identifiers. The magnitude can be utterance lengths (e.g., in seconds or other units). Likewise, similar plots can be created for the gaps between the identified utterances.

Once the utterance data, gap data, or any combination thereof, one or more summary statistics can be generated to create audio cues for the digital interviewing cues. For example, taking the utterance vector described in FIG. 10, a sample of summary statistics can be generated, such as max, min, median, and skew. Similar summary statistics can be generated on the gap vector. In another embodiment, a ratio of common utterance length to common gap length can be analyzed as illustrated in Equation (1), where utterance is the utterance vector and gap is the gap vector.

$$UtteranceGapRatio = \frac{median(utterance)}{median(gap)} \qquad (1)$$

Figure 11:
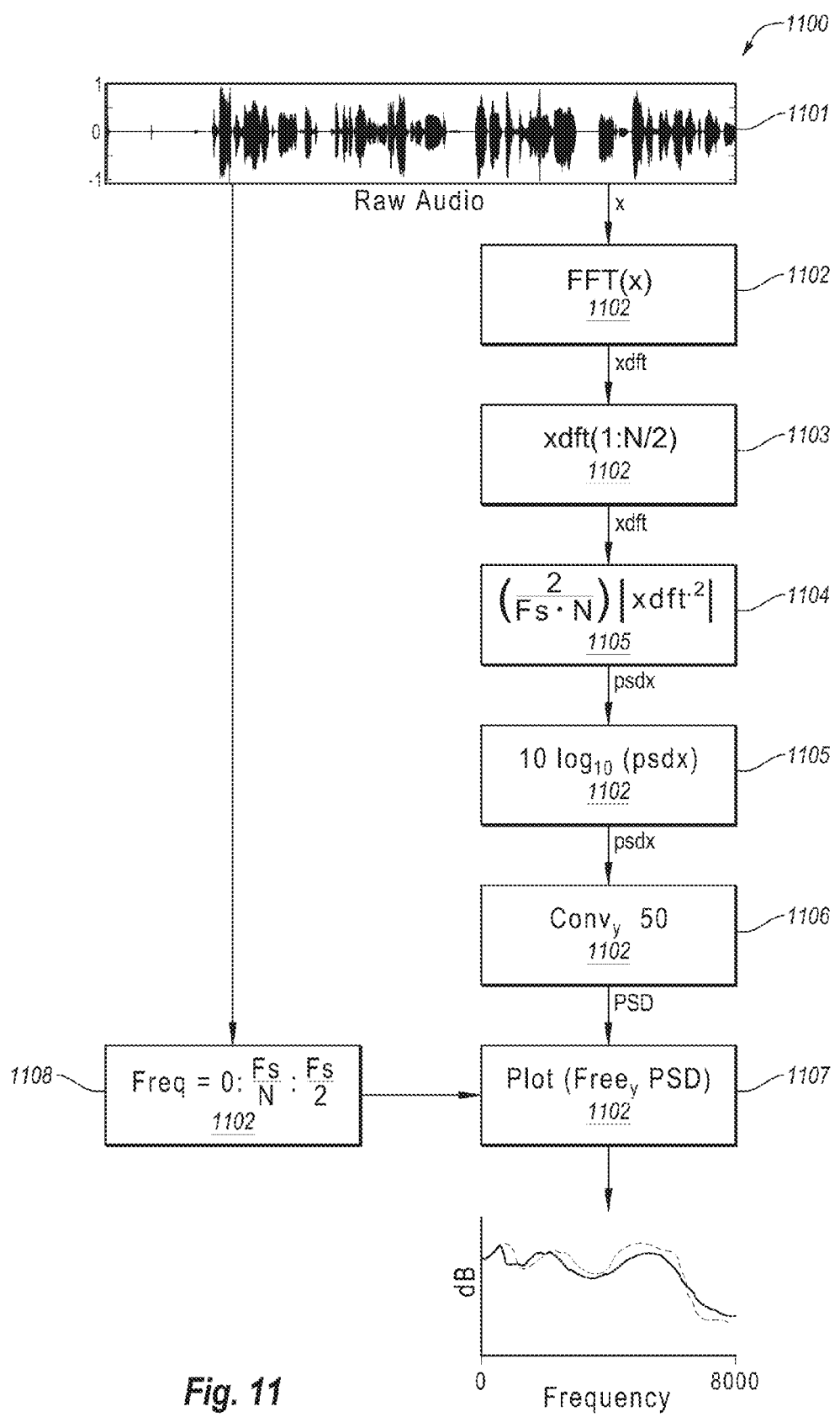
FIG. 11 is a flow diagram of a method for spectral analysis of audio data according to one embodiment.

FIG. 11 is a flow diagram of a method 1100 for spectral analysis of audio data according to one embodiment. Processing logic, as described herein, can perform the method 1100. Method 1100 shows a path taken to produce power spectrum density plots from the raw audio 1101. These plots may be used to generate multiple audio cues related to the interview. Possible cues include repetition metrics as well as specific frequencies, as described herein. The processing logic identifies the raw audio data 1101, and for each frequency of each sample, the processing logic computes the FFT 1102 of the raw audio samples. That is the raw audio samples can be time-based data that can be converted to the frequency domain using FFT. The FFT of raw audio can be computed by utterance, interview question, or an entire interview when the questions for a single candidate are stored in a single audio file. The FFT 1102 is not computed across candidates.

Once in the frequency domain, the processing logic can compute a power spectral density of the audio samples. In particular, the processing logic computes a frequency response 1103 of the audio samples in a window of a frequency spectrum (e.g., 0 to 8 MHz). The FFT 1102 is the same for the frequency response 1103, except it is only the first half of the data. The reason for this is the power spectrum density would be symmetric and it offers little value to include it because it would be redundant. The processing logic computes the power spectral density for the window (e.g., power at each frequency in the window). The processing logic computes [placeholder for description of 1105] 1105. The processing logic computes a moving average 1106 of the power spectral density using a moving window size of fifty samples. The processing logic can plot 1107 the computed PSD for each of frequencies computed at block 1108, such as illustrated in FIG. 12.

Figure 12:
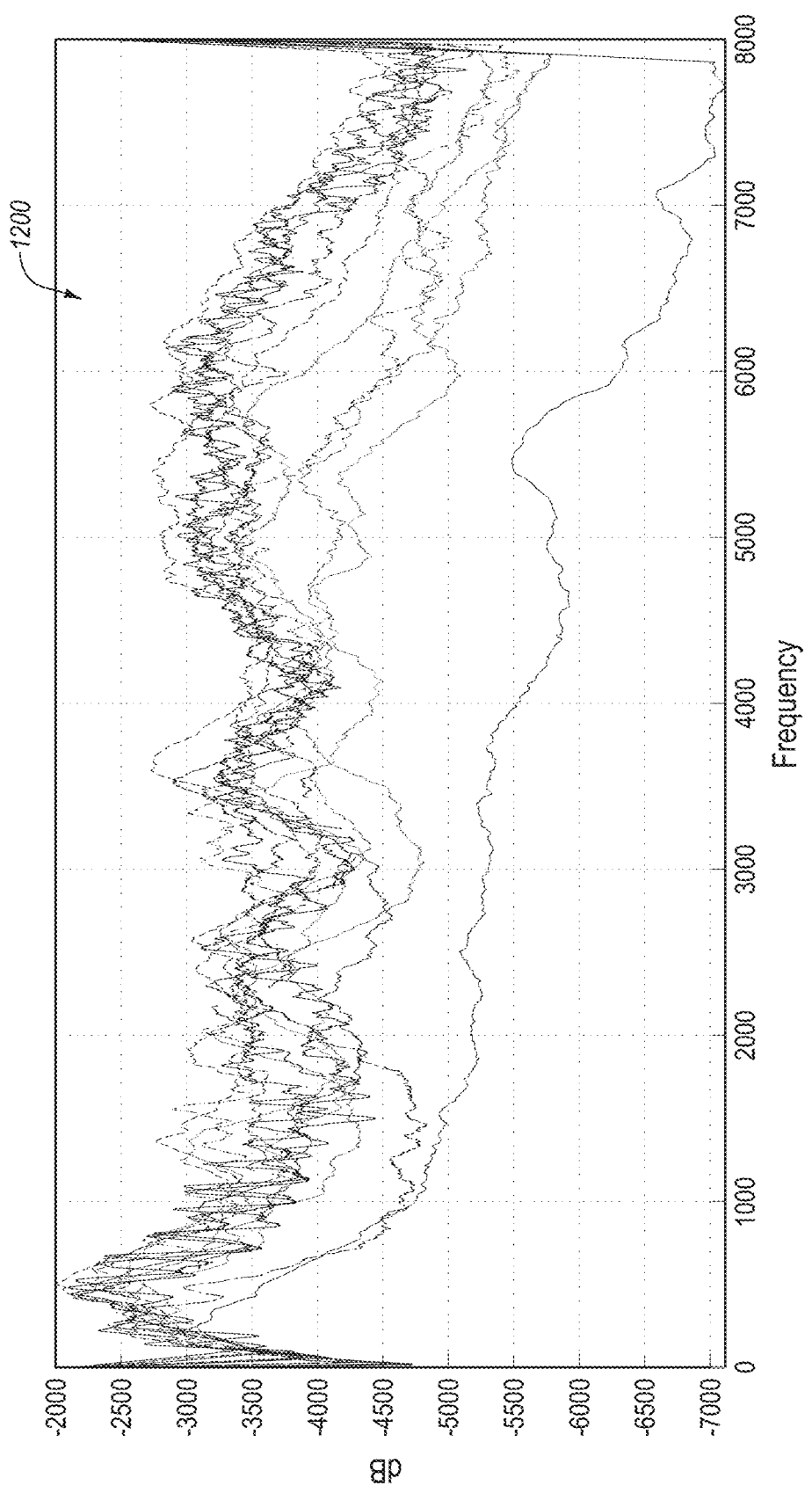
FIG. 12 is a graph of spectral analysis of identified utterances according to one embodiment.

FIG. 12 is a graph 1200 of spectral analysis of identified utterances according to one embodiment. The graph 1200 shows the spectral analysis for each of the identified utterances illustrated in FIG. 10. The spectral analysis can be used for a single word, one or more phrases, as well as for interview fingerprinting. The y axis of graph 1200 is the power 1201 and the x axis is the frequency 1202. Using the same utterance segmentation method described above, spectral analysis can be completed on each utterance. Using the utterance time series data, the processing logic can compute summary statistics for each window within the spectrum. For example, each window may be defined by stepping 500 kHz (i.e., 1-500 kHz=window 1, 501-1000 kHz=window 2, etc.). Alternatively, other window sizes can be defined, and different frequency ranges can be evaluated. The summary statistics that were used on the spectral analysis may include max, min, median, skew, standard deviation, mode, slop, kurtosis, or other types of summary statistics.

The embodiments described herein can also generate audio cues using repetition detection. For example, by taking each utterance and calculating its spectral signature, the processing logic can produce a valuable dataset that can be used to detect repetition in an interview. To detect repetition an utterance matrix can be built to represent each interview. This can be achieved by taking the utterance spectral response and interpolating it to fit within a predefined resolution of columns. For this example, 8000 columns are interpolated to capture 1 column for each frequency. A formal representation of the utterance matrix may be as represented in Equation (2).

$$U = \begin{bmatrix} \text{interpolate}(Utterance_1) \\ \text{interpolate}(Utterance_2) \\ \vdots \\ \text{interpolate}(Utterace_n) \end{bmatrix} \quad (2)$$

If the raw spectral analysis is collected for each utterance it can be combined into a single matrix using interpolation to allow vector combination. Once combined the utterance matrix, U, can be used to collect repetition metrics, as illustrated in FIG. 13.

Figure 13:
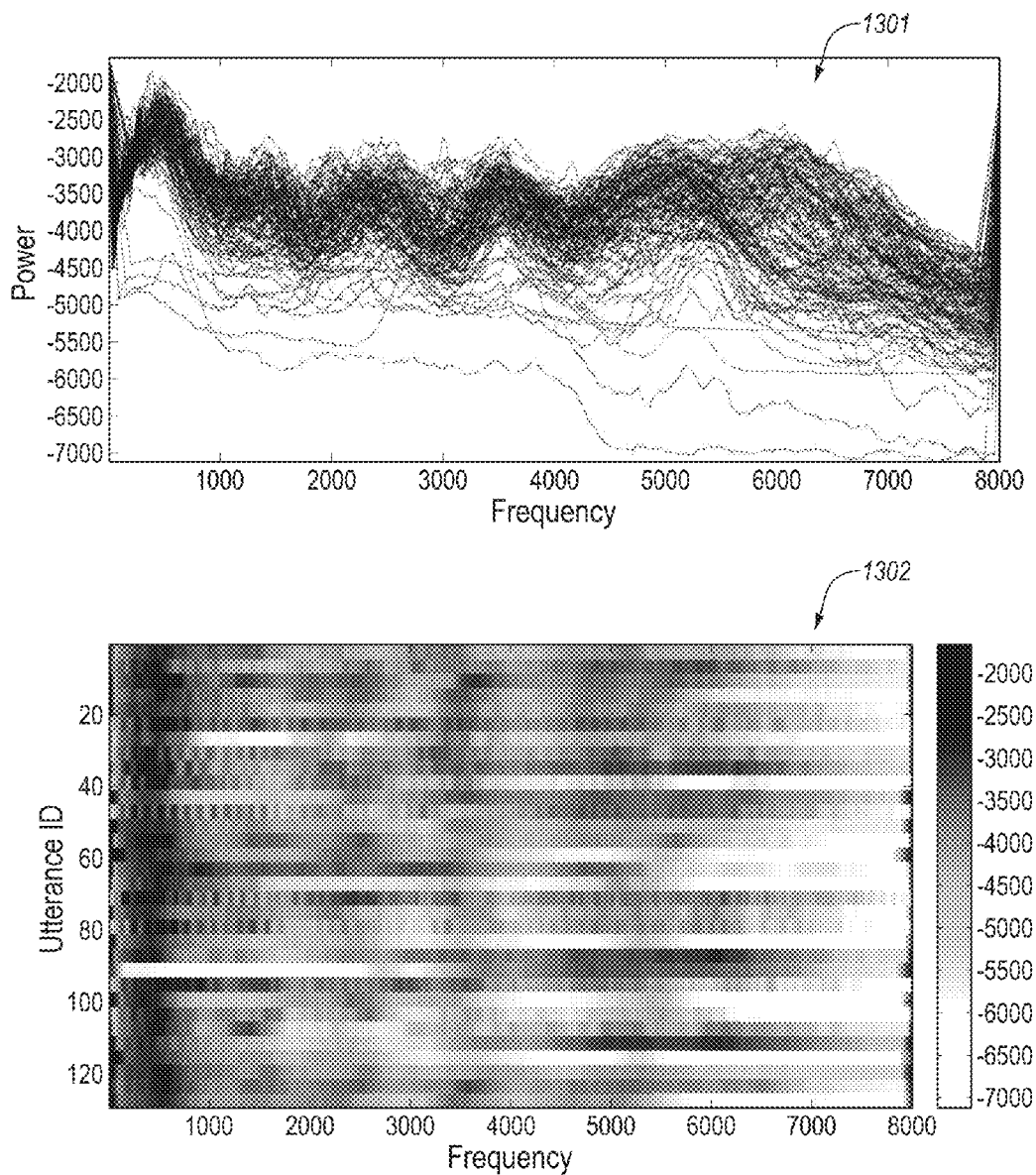
FIG. 13 are graphs of utterance spectral analysis and interpolations according to one embodiment.

FIG. 13 are graphs 1301-1302 of utterance spectral analysis and interpolations according to one embodiment. The graphs 1301-1302 of FIG. 13 represent a single candidates response to a single question during an interview. The graph 1301 shows the utterance spectral analysis and graph 1302 shows the interpolations of the utterances. In one embodiment, using the utterance matrix, U, the Euclidean norm of the matrix can be used to estimate repetition. Candidates with high repetition caused by repeating points or using many filler words may have higher singular values than candidates with diverse responses. In one embodiment, the following Equation (3) can be used, where the largest singular value of the matrix U is the Euclidean norm.

$$\text{InterviewRepetitionScore} = \|U\|_2, \quad (3)$$

Once the interview cues have been collected and the achievement score is known, a prediction model can be built to assist in the digital interviewing process. An example of this would be using the candidate interview decision (i.e., yes, maybe, no) as the achievement index and building a model to predict which candidates would have been more likely to pass the interview screen. The interview cues that were previously mentioned can be placed in a cue matrix, such as illustrated in Equation (4).

$$X = \begin{bmatrix} \text{median} & \text{median} & \text{utteranceGap} & \text{max} & \text{max} & \|U\|_2 & \text{min} & \text{skew} & \text{max} & \text{etc.} \\ \text{(utterance)} & \text{(gap)} & \text{Ratio} & \text{(gap)} & \text{(utterance)} & & (PSD(\text{audio})_{1-500}) & (PSD(\text{audio})_{1-500}) & (PSD(\text{audio})_{1-500}) & \\ 0.50 & 8.31 & 34.47 & 10.95 & 10.44 & 3291.57 & 2556.10 & 1685.90 & 845.91 & \ldots \\ 0.26 & 4.73 & 27.69 & 18.93 & 2.85 & 323.22 & 1143.09 & 1654.34 & 176.13 & \ldots \\ 0.42 & 1.08 & 37.07 & 3.74 & 11.67 & 4595.38 & 1751.22 & 1297.76 & 302.13 & \ldots \\ 0.16 & 6.50 & 36.25 & 14.02 & 14.60 & 2641.02 & 3340.31 & 1285.14 & 80.43 & \ldots \\ 0.04 & 4.26 & 16.25 & 5.79 & 5.62 & 772.67 & 2489.22 & 1118.96 & 53.46 & \ldots \\ 0.04 & 6.28 & 32.93 & 5.84 & 5.21 & 2288.41 & 3395.91 & 1219.17 & 693.73 & \ldots \\ \vdots & \vdots & \vdots & \vdots & \vdots & \vdots & \vdots & \vdots & \vdots & \ldots \\ 0.20 & 3.80 & 14.04 & 12.51 & 12.36 & 1938.81 & 2279.72 & 2169.21 & 617.36 & \ldots \end{bmatrix} \quad (4)$$

Each row represents a past candidate with a total candidate count of n. Likewise, the achievement score vector is available for each candidate based on past evaluator assessments, as represented in Equation (5).

$$y = \begin{bmatrix} y1 \\ y2 \\ \ldots \\ y3 \end{bmatrix} = \begin{bmatrix} \text{yes} \\ \text{no} \\ \ldots \\ \text{maybe} \end{bmatrix} \quad (5)$$

For non-numeric achievement data, the values can be mapped into a numerical representation. A natural conversion could be no=1, maybe=2, and yes=3, since maybe is better than no, and yes is better than maybe, as represented in Equation (6).

$$y = \begin{bmatrix} y1 \\ y2 \\ \ldots \\ y3 \end{bmatrix} = \begin{bmatrix} yes \\ no \\ \ldots \\ maybe \end{bmatrix} = \begin{bmatrix} 3 \\ 1 \\ \ldots \\ 2 \end{bmatrix} \quad (6)$$

Given matrices X and Y, a prediction model can be identified and tested using various methods. A good practice before building a model is to scale the inputs and normalize them to reduce the likelihood of a large input having a different impact on the prediction model than a smaller input value. Scaling also assists in model interpretation later when comparing between relative input contributions. Each column of X is scaled by its maximum value to produce a normalize matrix, as represented in Equation (7).

$$X_n = \begin{bmatrix} \text{median (utterance)} & \text{median (gap)} & \text{utteranceGap Ratio} & \text{max (gap)} & \text{max (utterance)} & \|U\|_2 & \text{min}(PSD(audio)_{1-500}) & \text{skew}(PSD(audio)_{1-500}) & \text{max}(PSD(audio)_{501-1000}) & etc. \\ 0.71 & 0.83 & 0.86 & 0.55 & 0.70 & 0.55 & 0.64 & 0.56 & 0.85 & \ldots \\ 0.38 & 0.47 & 0.69 & 0.95 & 0.19 & 0.05 & 0.29 & 0.55 & 0.18 & \ldots \\ 0.61 & 0.11 & 0.93 & 0.19 & 0.78 & 0.77 & 0.44 & 0.43 & 0.30 & \ldots \\ 0.23 & 0.65 & 0.91 & 0.70 & 0.97 & 0.44 & 0.84 & 0.43 & 0.08 & \ldots \\ 0.06 & 0.43 & 0.41 & 0.29 & 0.37 & 0.13 & 0.62 & 0.37 & 0.05 & \ldots \\ 0.06 & 0.63 & 0.82 & 0.29 & 0.35 & 0.38 & 0.85 & 0.41 & 0.69 & \ldots \\ \vdots & \vdots & \vdots & \vdots & \vdots & \vdots & \vdots & \vdots & \vdots & \ldots \\ 0.28 & 0.38 & 0.35 & 0.63 & 0.82 & 0.32 & 0.57 & 0.72 & 0.62 & \ldots \end{bmatrix} \quad (7)$$

Once the prediction model is built, the prediction model can be trained. Many different types of system identification algorithms exist to predict an output, y, given an input matrix, X. Some options of system identification algorithms include support vector machines, regressions, neural networks, and tree-structured classifiers. For example, the prediction model can be identified using a simple least squares regression and the solution is bootstrapped to get a sense of the out-of-sample performance. For example, the solution to the least squares problem in this case is defined by Equation (8).)

$$\beta = (X'_n X_n)^{-1} X_n y, \quad (8)$$

where β represents each interview cue's impact on the overall outcome of the candidate. Now that the prediction model is built using historical data, the prediction model can be used on future candidates. For example, a prediction for a new candidate, j, who has just completed the digital interview would be as follows in Equation (9).

$$y_{pj} = \beta x_j, \quad (9)$$

where $x_j$ is a row vector of all of the normalized inputs for candidate j and $y_{pj}$ is the predicted achievement index using prediction model β trained from historical evaluator data.

Figure 14:
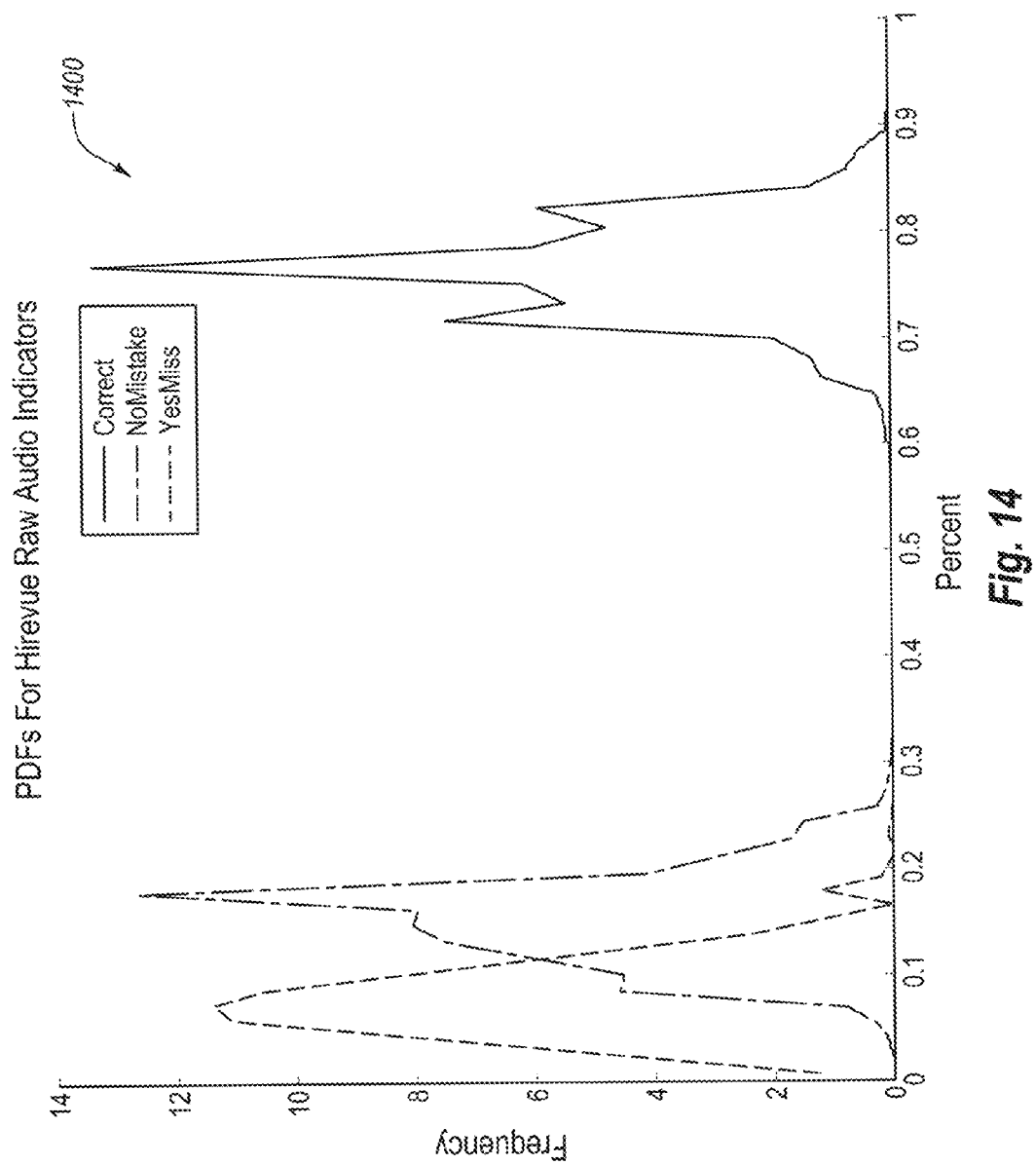
FIG. 14 is a graph of test results of a bootstrapping a model with existing data according to one embodiment.

The prediction model can be bootstrapped by taking a collection of five hundred interviews across multiple positions and employers and randomly training on eighty percent (80%) of the data, and testing on the remaining twenty percent (20%), the predictive power of the digital interviewing cues can be evaluated. Three scenarios can exist for each prediction, a first scenario where the prediction is a correction prediction, a second scenario where a poor candidate is predicted to perform and a third scenario where a passing candidate is predicted to be a "no." FIG. 14 is a graph 1400 of test results of a bootstrapping a model with existing data according to one embodiment. The graph 1400 shows bootstrap results from a split of eighty percent to twenty percent where the prediction model, β, is trained using only a random sample of eighty percent and then tested on the remaining twenty percent. The numeric prediction can be rounded to the closest possible Yes/No outcome. For example, the prediction, $y_p$=1.5, would be rounded down to 1, sine it is closer to 1 than 3, and therefore predict a no response.

The prediction model can be trained to maximize the correct response and minimize the good candidate misses. The results are much better than random and show value in addressing the problem of managing a large candidate pool effectively. Now candidates, that are currently sorted at random, can be sorted by a defined achievement index, assuming a historical dataset was evaluable for training. The candidate sorting based on achievement index is more likely to sort better candidates with higher achievement scores using this type of digital interviewing modeling technique.

Figure 15:
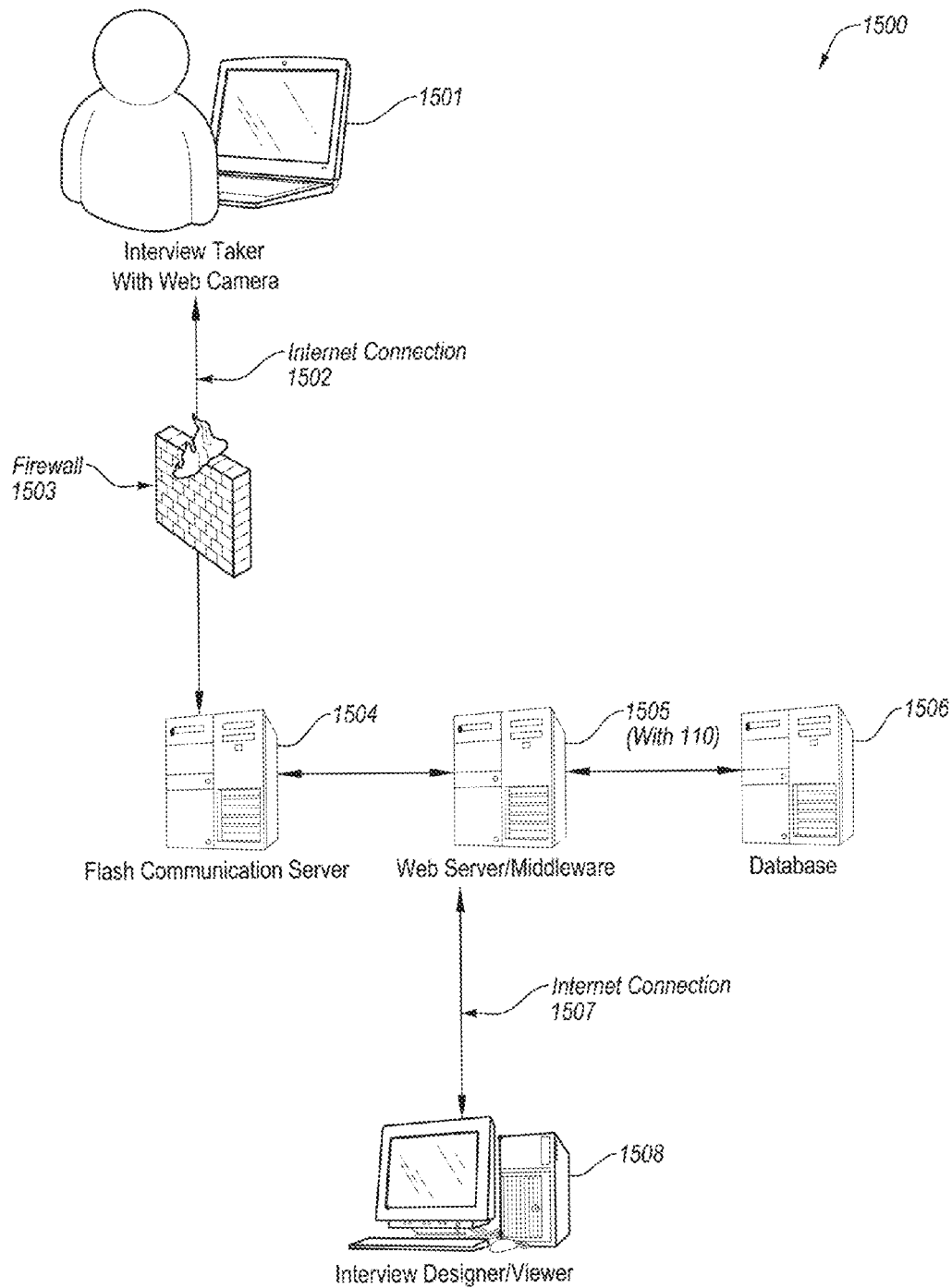
FIG. 15 is a block diagram of a network architecture in which embodiments of a model-driven candidate-sorting tool may operate.

FIG. 15 is a block diagram of a network architecture 1500 in which embodiments of a model-driven candidate-sorting tool 110 may operate. The network architecture 1500 can be used in the interview design of one or more digital interviews and conducting one or more interviews. The administrator of the digital interviewing platform can use a standard computer system 1508 with an Internet connection 1507 (or other network connection) to a web server 1505 (also referred to as middleware server. The web server 1505 includes the model-driven candidate-sorting tool 110 as described herein. In this embodiment, the candidate-sorting tool 110 resides on the web server 1505 and the web server 1505 is in communication with a database 1506 as well as with, in this example, a communication server 1504, such as a Flash communication server to facilitate communication with interviewees. The communication server 1504 communicates with the interviewee typically over an Internet connection 1502 (e.g., a public or private network connection). A firewall 1503 may be used to protect the security of the servers 1504, 1505 and the database 1506. The interviewee, using a computer system with a web camera 1501 interfaces over the Internet connected to answer questions, upload information, and conduct one or more interviews. The computer systems used by the administrator computer 1508 and the interviewer computer 1501 may be various types of computers, user devices, or other types of devices that are network compatible and include a web camera, a microphone, or any combination thereof to record the digital interview. The candidate data, including the recording of the digital interview are stored in the database 1506. For example, a video file, an audio file, textual data, or any combination of the digital interview can be captured by the communication server 1504 (or web server 1505) and stored in the database 1506.

Figure 16:
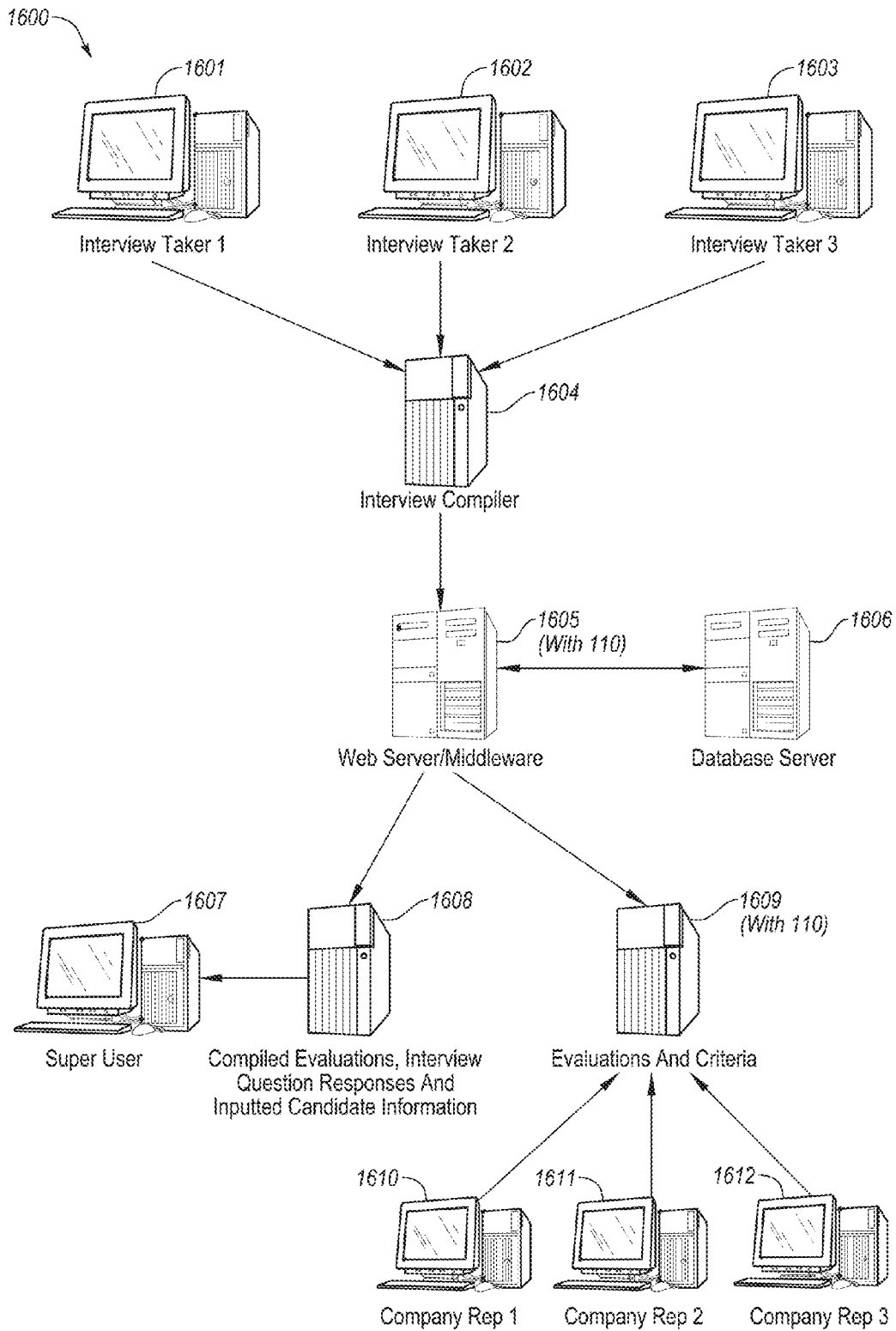
FIG. 16 is a block diagram of another network architecture in which embodiments of a model-driven candidate-sorting tool may operate.

FIG. 16 is a block diagram of another network architecture 1600 in which embodiments of a model-driven candidate-sorting tool 110 may operate. The network configuration 1500 can be used in the interview design of one or more digital interviews and conducting one or more interviews. In this embodiment, one or more interviewees access an interview computer 1604 using networked personal computers 1601, 1602, 1603. The interview computer 1604 is connected over a network connection to a web server 1605, where the candidate-sorting tool 110 may reside. The web server 1605 is connected to the database server 1606, where the stored data resides. The web server 1605 can be accessed by an administrator (or super user), using a personal computer 1607 that is connected to a storage server 1608, which can store such information as compiled evaluations, interview question responses and inputted candidate (interviewee) information. One or more reviewers, using networked personal computers 1610, 1611, 1612 can be connected to an evaluation storage server 1609, which can store information on evaluations and criteria in the interview processes described herein. The model-driven candidate-sorting tool 110 may reside in the web server 1605 or the evaluation storage server 1609.

In other embodiments, the interviewee clients may include any one of a number of clients which may be embodied, for example, as client computer systems being connected via an Internet connection or other suitable network connection. In one embodiment, one or more of the interviewee clients may be located at an on-site interview facility. In this example, interviewees can access the interviewee clients by visiting an office or other location where computer systems have been set up by an organization wishing to have candidates take interviews. The computers may have cameras, such as webcams, connected to the computer system. The computer system of the interviewee clients in this embodiment may be connected to the server through an internet connection, local area network (LAN) connection, other wide area network (WAN) connection, or through any other suitable client to server connection.

In an alternative embodiment, one or more of the interviewee clients may be located off site. In this example, an interviewee may use their own personal web cam and microphone, or may be provided with a web cam and microphone that can be connected to a personal computer at home or some other off site location that can serve as the interviewee client. Additionally, as some of the actions between the interviewee clients do not require a video feed and can be conducted at different times, the different interviewee clients can be used at different locations for different portions of the interview process even when some of the interviewee clients do not have access to a video camera and microphone. In embodiments where the interviewee client is off site, the interviewee client should have access to an Internet connection with sufficient speed to transmit appropriate data. For example, lower speed connections may be used to transmit textual application materials or textual responses to questions. However, higher speed connections may be needed to stream video responses to the server.

In yet another alternative embodiment similar to the on-site example above, a campus network may be used to provide suitable computers and network connections to enable the interviewee clients. In this embodiment, a company can design and post a request for interviews to a college career center. The career center or company can then invite applicants to sit for an interview on-campus. The server coordinates messaging for inviting candidates to interview, receiving candidate's application materials, taking the candidate's interview, and providing the interview to evaluators. While a single server is shown, it should be understood that the server may include one or more servers such as the communication server 1504, web server 1505, and database server 1506 illustrated in FIG. 15, or any other suitable server configuration. The server 1504 may be operated by a hosting company that manages the process of taking interviews, storing interviews, and providing interview for viewing by reviewers. In one embodiment, the hosting company may provide custom build capabilities such that a client company can select various appearance and interview constraints. For example, the client company may be able to specify branding an appearance of user interfaces seen by candidates at the interviewee clients as well as interfaces seen by users at evaluator clients. In another embodiment, a company may choose to host their own interview server for various reasons, including to reduce the amount of Internet traffic from a company to an interview server hosting company.

The evaluator clients may be implemented in a number of different ways. For example, the evaluator clients may be home computers of evaluators where the home computers are connected to a suitable Internet connection. In an alternative embodiment, the evaluator clients may be company computers that are connected to the server through a company LAN, WAN, or other suitable connection. While evaluator clients is used as a descriptor, it should be understood the one need not necessarily evaluate an interview to use an evaluator client. For example administrators, managers, and the like may use evaluator clients to create interviews, assign user rights, schedule interviews, add candidates to interviews, and the like, as illustrated in more detail below, but do not need to necessarily evaluate any interviews. It should also be noted that the digital interviewing platform can be hosted as a web-based application in which a user, whether a candidate or a reviewer, can access the digital interviewing platform using a web browser, mobile application, or the like.

An evaluator client can be used to create an interview. When creating an interview, a user at an evaluator client may upload questions, specify the question type, specify an amount of time allowed to answer the question, etc. The user may also specify the job title and other information as explained previously herein. Application materials can be received by the server from an interviewee client. The application materials can be an electronic version of a resume, information from an on-line job application, information entered by a campus career center, or other similar information.

A company representative at an evaluator client can review potential candidates by their application materials and select candidates to be interviewed by sending a select candidate message from an evaluator client which is received at the server. The server can notify interviewees by sending an invitation and access credentials to interviewee clients. As noted previously herein, different actual machines may be used to implement the functionality of the interviewee clients. For example, an interviewee's own personal home computer may receive an email message, which includes the invitation and access credentials. The actual on-line interview may take place on a different computer, but the interviewee's own personal home computer still implements interviewee client functionality. Alternatively, the interviewee client functionality is not implemented in a client application, rather is the server presents user interface to a browser on the interviewee's computer.

To take the interview, questions are sent by the server and received by an interviewee client. As mentioned previously, the interviewee client may be for example, an interviewee's own personal computer, an on-site computer, an off-site computer, etc. As mentioned previously, an indicator of when the question was sent may be maintained by the server so as to limit the amount of time that an interviewee has to read and comprehend the question or to time the amount of time an interviewee takes to respond to the question. As described previously, the questions may be for example, audio/video recorded questions; multiple choice questions; true/false questions; yes/no questions; short answer questions, Where the interviewee is asked to type in a response; uploaded file document based questions, such as a diagram, a section of text, mathematical problems and the like with one or more questions asking the interviewee to view and analyze the file document; etc.

Responses are sent by an interviewee client and received by the server in response to the question. An audio/video recorded question may be sent as a text question that is answered by responding verbally while being recorded by a camera and microphone. In one embodiment, the response to an audio/video question may be streamed to the server. For example, using streaming audio and video technology, the audio and video of the response is sent directly to the server in near real time.

Multiple choice responses, true/false responses; yes/no responses; and short answer responses may be provided by an interviewee at an interviewee client by the interviewee selecting appropriate check boxes, radio buttons, or filling in text boxes. Uploaded file document based responses, may be provided by scanning documents, uploading electronic documents, sketching on a pen tablet input device, inputting drawings and text by using interface devices such a mouse and keyboard, etc.

Figure 17:
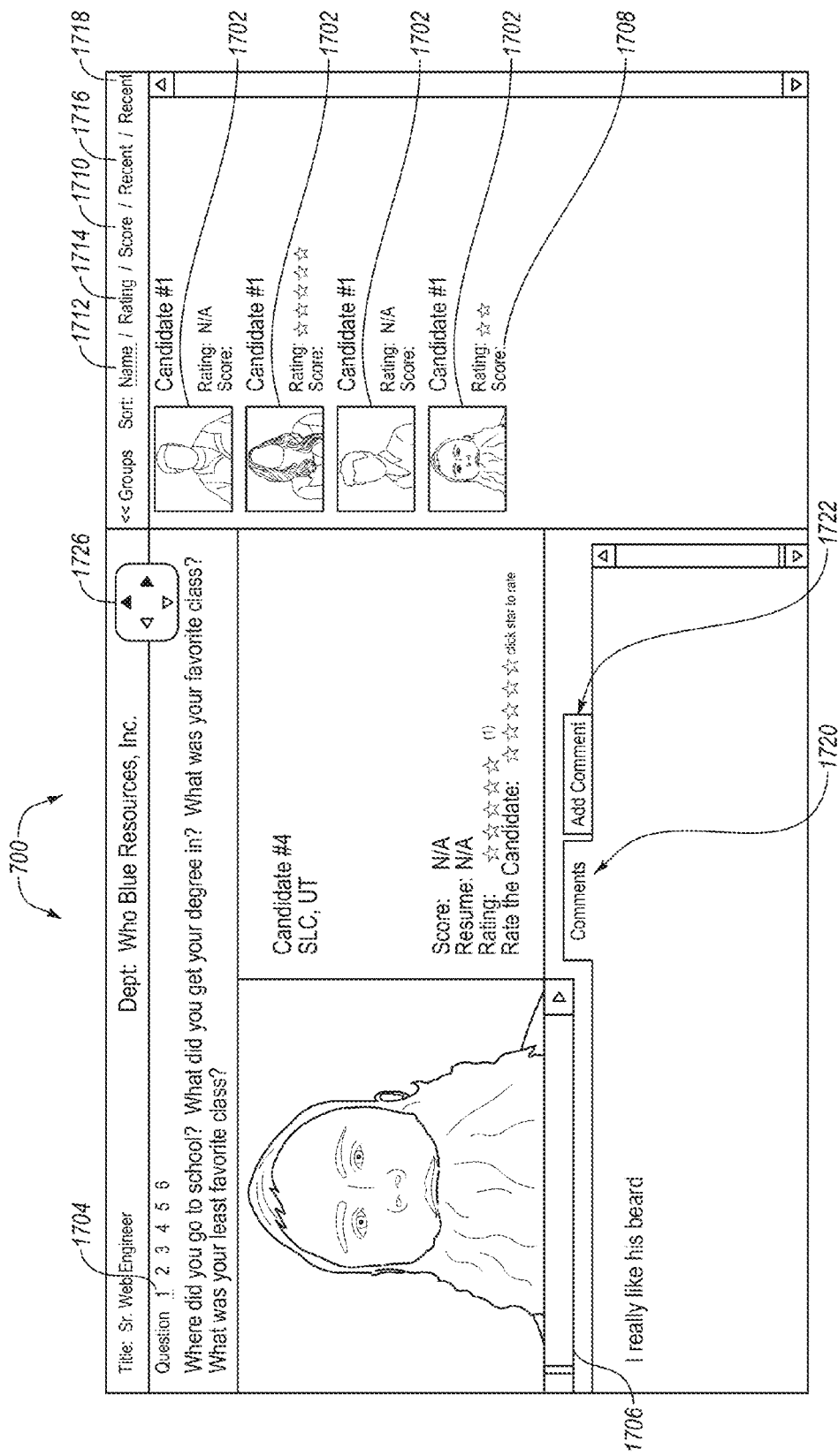
FIG. 17 illustrates an exemplary user interface for viewing digital interviews according to one embodiment.

Interviews that have been taken can then be viewed by a reviewer at an evaluator client. Alternatively, the reviewer can review interviews by accessing the interviews using a browser to a web-based application. For example, a company may have a database with many interviews from candidates, which may include video data files, and/or typed/selected responses, for many different positions. For example, when a hiring manager logs into interview server, the hiring manager can be presented a page where the hiring manager can see the group of interviews, such as illustrated in FIG. 17, where the hiring manager can watch and evaluate the interviews. For example, an evaluator can select an interview to view by activating a candidate, which sends a select interview message from the evaluator client to the server. The evaluator may then be presented with a user interface, such as the user interface 1700 illustrated in FIG. 17 to evaluate the different candidates giving interviews.

FIG. 17 illustrates an exemplary user interface 1700 for viewing digital interviews according to one embodiment. The evaluator can select a candidate by selecting a link on the list of candidates 702 in the user interface 1700 that is displayed on an evaluator client. When the evaluator selects a candidate from the user interface 1700, the select candidate message is sent from the evaluator client to the server. An evaluator may select candidates by selecting up and down arrows on a navigation button 1726. Alternatively, other navigation elements may be used to navigate the user interface 1700 to select a candidate, select a response to a question, to start a video, pause the video, control a volume, or the like. For example, an evaluator may use the user interface 1700 to select a question by selecting a question link such as the one shown at 1704 or by selecting one of the right or left arrows of the navigation button 1726. This causes a select question message to be sent to the server. As described previously, a response may be selected and then each candidate's response to the question can be evaluated in a somewhat "side-by-side" direct comparison manner. Alternatively, a candidate may be selected, and some or all of the responses for that candidate may be reviewed before proceeding on to another candidate. As an example, messages may be sent from the evaluator client to the server with comments to be added in the add comments field 1722 of the user interface 1700.

Interviews can be selected in the user interface 1700 for viewing. During the review, the user (typically an administrator or reviewer) can watch the interviews and evaluate the candidates. The user interface 1700 may include a candidate's thumbnail pictures 1702. The user then can select which question 1704 he or she wishes to watch from whichever candidate they choose. Once selected, a recorded clip 1706 showing the interviewee answering the selected question can be displayed if related to a video recorded question, presently using streaming video. In one embodiment, the video may be displayed using Macromedia Flash-based streaming available from Adobe Corporation of San Jose, Calif.

If there are gradable questions in the interview of interest, such as multiple choice, true/false or yes/no, the candidates test score 1708 can be presented in a display of the scores of all of the candidates. Candidates can be sorted by score as illustrated at 1710, such as for example, with the best score located at the top of the list. Candidates may alternatively be sorted by name illustrated at 1712, rating illustrated at 1714, or be how recently they were interviewed as illustrated at 1716. As described herein, the candidate-sorting tool 110 can be used to sort the list of candidates according to predicted achievement indices illustrated at 1718. When the AI sorting element is activated, the list of candidates is sorted so that the candidate with the highest predicted achievement index is listed first for review. This way, a reviewer can review the list of candidates according to the predictions based on the prediction model for the defined achievement index.

As the users watch the candidates answer the questions, they can input their ratings of the candidates. For example, at 1718 a user may rate a candidate on a five-point scale by selecting a number of stars. These ratings can be stored in the digital interview data. The ratings in a 1-5 scale can be used to better organize which candidates the reviewer likes or dislikes and can be used to present the evaluation in the matrix section.

The user may also enter comments in a comments section and in some embodiments the user may choose to see comments from other users who have viewed the interview. For example at 1720, a user can review comments, and at 722, a user may add comments in a text box field. The candidate's biographical information may be displayed. For example, the candidate's biographical information may be displayed at 1724. This biographical information may be adapted from an uploaded resume (from either the candidate or the interviewer's organization). The biographical information may include the results from questions (some or all) and the results on gradable questions. This display of biographical information and results may be presented, for example, in a document format such as a PDF format, to permit the answers, and the biographical information, to be viewed and printed along with the evaluation. After the candidates have been evaluated, the administrator or other designated evaluator on the account are provided the capability to effect an overall evaluation by viewing a displayed page, such as the graphical user interface 1700 that can have a compilation of all results and evaluations of the candidates. A results page may also be displayed to display comments and evaluations from the evaluators who reviewed the candidates. This results page can also be printed, in some embodiments with the compilation page, to be kept in a file for legal and other compliance documentation.

In another embodiment, the graphical user interface 1700 further includes tools for customized evaluation of candidates either individually or as a group. For example, the navigation button 1726 may be used to navigate questions and candidates. For example, up and down arrows on the navigation button 1726 allows a user to scroll through candidates. For example, the details of a candidate name Candidate #4 are shown and Selecting the up arrow of the navigation button 1726 causes details of Candidate #3 to be displayed at 1724. Also, the navigation button 1726 also allows for selection of questions. For example, question number 1 is currently displayed in the graphical user inter face 1700. By selecting the right arrow of the navigation button 1726, question number 2 can be viewed, and the candidate's video response can be watched. after watching a candidates response to a particular question, a different candidates response to the same question can be watched either by navigating candidates using the up and down arrows of the navigation button 1726 or by selecting a link directly-associated with the candidate. The user interface 1700 is one example of a view presented to a reviewer by the digital interviewing platform. As described herein, a hosted application of the digital interview platform can present the user interface 1700, as well as other views, to the reviewers to permit the evaluation of multiple candidates. The candidate-sorting tool 110 can be used to make the evaluation of multiple candidates more efficient by sorting the candidates according to predictions based on the defined achievement index or indices.

The embodiments described herein may provide various benefits over conventional solutions. For example, the embodiments described herein can be used to manage large candidate pools, as well as provide more accurate achievement predictions for digital interviewing processes. For large candidate pool management using the predictive achievement score from a model developed using digital interviewing cues, a number of candidates applying for a given position becomes irrelevant. Now a single recruiter or admission judge can manage thousands or even millions of candidates by focusing on the ones most likely to have the desired achievement score. As the model's sophistication and training continue to develop, the number of poor candidates that are reviewed will continue to be reduced. Also, by relying on more powerful cue combinations for achievement prediction employers can remove some of the previous thresholds used for filtering (i.e., GPA, degree obtained, etc.) to help insure they are not missing great candidates prematurely. Using GPA as a filter is no longer required since larger candidate pools can be sorted algorithmically.

For more accurate achievement prediction, assessment models used currently do not include the digital interview cues described herein, including audio cues related to audio and video cues related to video processing, coupled with interaction metrics. Instead, reviewers are left with using a subjective "gut feel" to determine the quality of the interview and how the weight of each response plays into the screening process or the final decision. Using the "gut feel" process has been shown to lack in consistency, which leads to reduced hiring quality. In some cases, a model built from an evaluator's historical responses, as described herein, may outperform the evaluator's future decisions. Using this holistic modeling approach where many factors are considered at once may provide a useful tool that exceeds anything human evaluators can consciously process and quantify.

Figure 18:
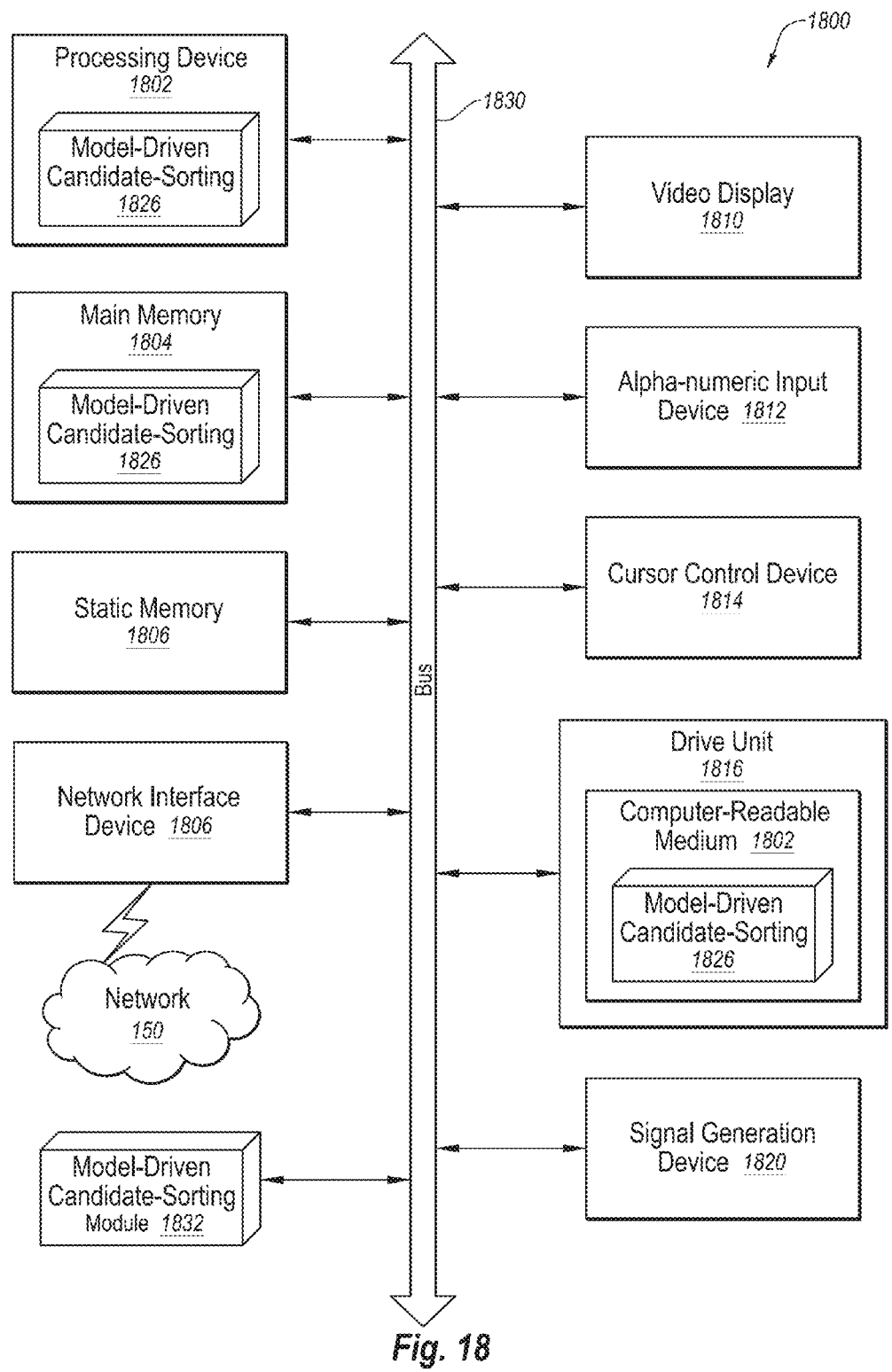
FIG. 18 illustrates a diagrammatic representation of a machine in the example form of a computing system for model-driven candidate sorting.

FIG. 18 illustrates a diagrammatic representation of a machine in the exemplary form of a computing system for model-driven candidate sorting. Within the computing system 1800 is a set of instructions for causing the machine to perform any one or more of the methodologies discussed herein. In alternative embodiments, the machine may be connected (e.g., networked) to other machines in a LAN, an intranet, an extranet, or the Internet. The machine may operate in the capacity of a server or a client machine in a client-server network environment, or as a peer machine in a peer-to-peer (or distributed) network environment. The machine may be a PC, a tablet PC, a set-top-box (STB), a personal data assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein for model-driven candidate sorting for evaluating digital interviews, such as the methods 700, 800, 1100 described above. In one embodiment, the computing system 1800 represents various components that may be implemented in the server computing system 104 as described above. Alternatively, the server computing system 104 may include more or less components as illustrated in the computing system 1800.

The exemplary computing system 1800 includes a processing device 1802, a main memory 1804 (e.g., read-only memory (ROM), flash memory, dynamic random access memory (DRAM) such as synchronous DRAM (SDRAM), etc.), a static memory 1806 (e.g., flash memory, static random access memory (SRAM), etc.), and a data storage device 1816, each of which communicate with each other via a bus 1830.

Processing device 1802 represents one or more general-purpose processing devices such as a microprocessor, central processing unit, or the like. More particularly, the processing device 1802 may be a complex instruction set computing (CISC) microprocessor, reduced instruction set computing (RISC) microprocessor, very long instruction word (VLIW) microprocessor, or a processor implementing other instruction sets or processors implementing a combination of instruction sets. The processing device 1802 may also be one or more special-purpose processing devices such as an application specific integrated circuit (ASIC), a field programmable gate array (FPGA), a digital signal processor (DSP), network processor, or the like. The processing device 1802 is configured to execute the processing logic (e.g., model-driven candidate sorting 1826) for performing the operations and steps discussed herein.

The computing system 1800 may further include a network interface device 1822. The computing system 1800 also may include a video display unit 1810 (e.g., a liquid crystal display (LCD) or a cathode ray tube (CRT)), an alphanumeric input device 1812 (e.g., a keyboard), a cursor control device 1814 (e.g., a mouse), and a signal generation device 1820 (e.g., a speaker).

The data storage device 1816 may include a computer-readable storage medium 1824 on which is stored one or more sets of instructions (e.g., model-driven candidate sorting 1826) embodying any one or more of the methodologies or functions described herein. The model-driven candidate sorting 1826 may also reside, completely or at least partially, within the main memory 1804 and/or within the processing device 1802 during execution thereof by the computing system 1800, the main memory 1804 and the processing device 1802 also constituting computer-readable storage media. The model-driven candidate sorting 1826 may further be transmitted or received over a network via the network interface device 1822.

While the computer-readable storage medium 1824 is shown in an exemplary embodiment to be a single medium, the term "computer-readable storage medium" should be taken to include a single medium or multiple media (e.g., a centralized or distributed database, and/or associated caches and servers) that store the one or more sets of instructions. The term "computer-readable storage medium" shall also be taken to include any medium that is capable of storing a set of instructions for execution by the machine and that causes the machine to perform any one or more of the methodologies of the present embodiments. The term "computer-readable storage medium" shall accordingly be taken to include, but not be limited to, solid-state memories, optical media, magnetic media or other types of mediums for storing the instructions. The term "computer-readable transmission medium" shall be taken to include any medium that is capable of transmitting a set of instructions for execution by the machine to cause the machine to perform any one or more of the methodologies of the present embodiments.

The model-driven candidate sorting module (e.g., deliver cost module) 1832, components, and other features described herein can be implemented as discrete hardware components or integrated in the functionality of hardware components such as ASICS, FPGAs, ASPs, or similar devices. The model-driven candidate-sorting module 1832 may implement operations of model-driven candidate sorting as described herein. In addition, the model-driven candidate sorting module 1832 can be implemented as firmware or functional circuitry within hardware devices. Further, the model-driven candidate sorting module 1832 can be implemented in any combination hardware devices and software components.

Some portions of the detailed description that follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "receiving," "generating," "communicating," "capturing," "executing," "defining," "specifying," "creating," "recreating," "processing," "providing," "computing," "calculating," "determining," "displaying," or the like, refer to the actions and processes of a computing system, or similar electronic computing systems, that manipulates and transforms data represented as physical (e.g., electronic) quantities within the computing system's registers and memories into other data similarly represented as physical quantities within the computing system memories or registers or other such information storage, transmission or display devices.

Embodiments of the present invention also relate to an apparatus for performing the operations herein. This apparatus may be specially constructed for the required purposes, or it may comprise a general-purpose computing system specifically programmed by a computer program stored in the computing system. Such a computer program may be stored in a computer-readable storage medium, such as, but not limited to, any type of disk including optical disks, CD-ROMs, and magnetic-optical disks, read-only memories (ROMs), random access memories (RAMs), EPROMs, EEPROMs, magnetic or optical cards, or any type of media suitable for storing electronic instructions.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to utilize the invention and various embodiments with various modifications as may be suited to the particular use contemplated.

What is claimed is:

1. A method comprising:
   selecting a data set of digital evaluation data for model-driven candidate sorting on a digital evaluation platform comprising a server device, wherein the data set comprises candidate data recorded for a plurality of evaluation candidates;
   determining, by the processing device, a predictive model by solving a first linear equation using a system identification algorithm with historical digital evaluation cues as a first input to the first linear equation and historical achievement indices as a second input to the first linear equation;
   for the plurality of evaluation candidates,
      analyzing, by the server device, the digital candidate data for the respective evaluation candidate to identify a plurality of digital evaluation cues; and
      calculating, by the server device, an achievement index using a second linear equation with the plurality of digital evaluation cues as a first input to the second linear equation and the prediction model as a second input to the second linear equation;
   sorting a list of the plurality of evaluation candidates based on the predicted achievement indices; and
   presenting the sorted list of the plurality of evaluation candidates in a user interface to a reviewer.

2. The method of claim 1, wherein the plurality of digital evaluation cues comprise audio cues, and wherein the analyzing the digital candidate data comprises inspecting an audio signal of the digital candidate data to identify the audio cues.

3. The method of claim 1, wherein the plurality of digital evaluation cues comprises video cues, and wherein the analyzing the digital candidate data comprises inspecting a video signal of the candidates data to identify the video cues.

4. The method of claim 1, wherein the plurality of digital evaluation cues comprise at user interaction cues, and wherein the analyzing the digital candidate data comprises inspecting a log of user interactions to identify the user interaction cues.

5. The method of claim 1, wherein the plurality of digital evaluation cues comprise at least one of audio cues, video cues or user interaction cues, and wherein the analyzing the digital candidate data further comprises identifying additional digital evaluation cues comprising personal digital candidate data.

6. The method of claim 1, further comprising calculating an additional achievement index using the second linear equation with the digital evaluation cues for the respective evaluation candidate as the first input to the second linear equation and the prediction model as the second input to the second linear equation, and wherein the sorting comprises sorting the list of the plurality of evaluation candidates based on at least one of the achievement indices or the additional achievement indices.

7. The method of claim 1, further comprising collecting the digital evaluation data of the data set, wherein the collecting the digital evaluation data comprises collecting timing data, wherein the collecting the timing data comprises at least one of:
 determining a time metric representative of the respective evaluation candidate's timeliness on starting and completing an evaluation; or
 determining whether the respective evaluation candidate missed a deadline or requested additional time to complete the evaluation.

8. The method of claim 1, further comprising collecting the digital evaluation data of the data set, wherein the collecting the digital evaluation data comprises collecting audio data, wherein the sorting tool comprises an audio cue generator, wherein the collecting the audio data comprises:
 identifying, by the audio cue generator, utterances in the audio data of a digital evaluation by the respective candidate, wherein the utterances each comprise a group of one or more words spoken by a candidate in the digital evaluation; and
 generating, by the audio cue generator, the audio cues of the digital evaluation based on the identified utterances.

9. The method of claim 1, further comprising collecting the digital evaluation data of the data set, wherein the collecting the digital evaluation data comprises collecting video data, wherein the sorting tool comprises a video cue generator, wherein the collecting the video data comprises at least one of:
 determining, by the video cue generator, video metrics in video data of a digital evaluation by the respective candidate; and
 generating, by the video cue generator, the video cues of the digital evaluation based on the video metrics, wherein the video metrics comprise at least one of the following:
 a heart rate detection;
 a candidate facial expression;
 eye movement data;
 environment data; or
 candidate movement data.

10. The method of claim 1, wherein the presenting the sorted list of the plurality of evaluation candidates in the user interface comprises presenting the sorted list in a view of a digital evaluation platform in response to activation of a user interface element for achievement index sorting.

11. The method of claim 1, further comprising developing the prediction model, wherein developing the prediction model comprises:
 gathering the historical digital evaluation cues; and
 linking the historical digital evaluation cues to the historical achievement indices.

12. The method of claim 1, further comprising:
 obtaining the historical digital evaluation cues;
 storing the historical digital evaluation cues in a cue matrix, wherein rows of the cue matrix each represent one of a plurality of past candidates and columns of the cue matrix represent each of the historical digital evaluation cues;
 storing historical achievement indices of the plurality of candidates in an achievement score vector;
 building the prediction model using the cue matrix and the achievement score vector, wherein the cue matrix represents an input matrix of the system identification algorithm and the achievement score vector represents an output matrix of the system identification algorithm; and
 training the prediction model, wherein the system identification algorithm is at least one of a support vector machine, regressions, neural networks, tree-structure classifiers, or symbolic regression using genetic programming.

13. The method of claim 1, wherein the achievement index is at least one of an expected candidate evaluation score, an expected candidate decision, a work performance metric, a metric indicative of a likelihood of termination after a defined period, an academic performance metric, or a future performance metric.

14. A non-transitory computer readable storage medium including instructions that, when executed by a processing device of a computing system, cause the computing system to perform operations comprising:
 selecting a data set of digital evaluation data for model-driven candidate sorting on a digital evaluation platform comprising a server device, wherein the data set comprises digital candidate data recorded for a plurality of evaluation candidates;
 determining, by the server device, a predictive model by solving a first linear equation using a system identification algorithm with historical digital evaluation cues as a first input to the first linear equation and historical achievement indices as a second input to the first linear equation;
 for the plurality of evaluation candidates,
 analyzing, by the server device, the digital candidate data for the respective evaluation candidate to identify a plurality of digital evaluation cues; and
 calculating, by the server device, an achievement index using a second linear equation with the plurality of digital evaluation cues as a first input to the second linear equation and the prediction model as a second input to the second linear equation;
 sorting, by the server device, a list of the plurality of evaluation candidates based on the predicted achievement indices; and
 presenting, by the server device, the sorted list of the plurality of evaluation candidates in a user interface to a reviewer.

15. The non-transitory computer readable storage medium of claim 14, wherein the plurality of digital evaluation cues comprise at least one of audio cues, video cues or user interaction cues, and wherein the analyzing the digital candidate data further comprises identifying additional digital evaluation cues comprising personal digital candidate data.

16. The non-transitory computer readable storage medium of claim 14, wherein the digital evaluation data comprises audio data, wherein the operations further comprise:
 identifying, by the processing device, utterances in the audio data of a digital evaluation by the respective candidate, wherein the utterances each comprise a group of one or more words spoken by a candidate in the digital evaluation; and generating, by the processing device, audio cues of the digital evaluation based on the identified utterances.

17. The non-transitory computer readable storage medium of claim 16, wherein the operations further comprise:
obtaining the historical digital evaluation cues;
storing the historical digital evaluation cues in a cue matrix, wherein rows of the cue matrix each represent one of a plurality of past candidates and columns of the cue matrix represent each of the historical digital evaluation cues;
storing historical achievement indices of the plurality of candidates in an achievement score vector;
building the prediction model using the cue matrix and the achievement score vector, wherein the cue matrix represents an input matrix of the system identification algorithm and the achievement score vector represents an output matrix of the system identification algorithm; and
training the prediction model.

18. A computing system comprising:
a data storage device; and
a server device of a digital evaluation platform, the server device being coupled to the data storage device, wherein the server device is operable to execute a sorting tool to perform the following:
select a data set of digital evaluation data for model-driven candidate sorting on the digital evaluation platform, wherein the data set comprises digital candidate data recorded for a plurality of evaluation candidates;
determine a predictive model by solving a first linear equation using a system identification algorithm with historical digital evaluation cues as a first input to the first linear equation and historical achievement indices as a second input to the first linear equation;
for the plurality of evaluation candidates,
analyze the digital candidate data for the respective evaluation candidate to identify a plurality of digital evaluation cues; and
calculate an achievement index using a second linear equation with the plurality of digital evaluation cues as a first input to the second linear equation and the prediction model as a second input to the second linear equation;
sort a list of the plurality of evaluation candidates based on the predicted achievement indices; and
present the sorted list of the plurality of evaluation candidates to a reviewer in a user interface of the digital evaluation platform.

19. The computing system of claim 18, wherein the digital evaluation platform is a web-based application, and wherein the data storage device stores a digital evaluation data repository comprising the data set of digital evaluation data, the prediction model, and the digital evaluation cues.

20. The computing system of claim 18, wherein the digital evaluation data comprises audio data, wherein the sorting tool is further to:
identify utterances in the audio data of a digital evaluation by the respective candidate, wherein the utterances each comprise a group of one or more words spoken by a candidate in the digital evaluation; and
generate audio cues of the digital evaluation based on the identified utterances.

\* \* \* \* \*